(12) United States Patent
Kusama et al.

(10) Patent No.: US 11,050,048 B2
(45) Date of Patent: Jun. 29, 2021

(54) ELECTRODE STRUCTURE, SECONDARY BATTERY, BATTERY PACK, AND VEHICLE

(71) Applicant: KABUSHIKI KAISHA TOSHIBA, Minato-ku (JP)

(72) Inventors: Tomoe Kusama, Kawasaki (JP); Yasuhiro Harada, Isehara (JP); Kazuomi Yoshima, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/913,336

(22) Filed: Mar. 6, 2018

(65) Prior Publication Data

US 2019/0088927 A1 Mar. 21, 2019

(30) Foreign Application Priority Data

Sep. 19, 2017 (JP) .............................. JP2017-179313

(51) Int. Cl.
*H01M 4/131* (2010.01)
*H01M 50/44* (2021.01)
*H01M 50/46* (2021.01)
*H01M 50/449* (2021.01)
*H01M 50/411* (2021.01)
*H01M 10/0525* (2010.01)
(Continued)

(52) U.S. Cl.
CPC ....... *H01M 4/131* (2013.01); *H01M 10/0525* (2013.01); *H01M 10/44* (2013.01); *H01M 50/411* (2021.01); *H01M 50/44* (2021.01); *H01M 50/449* (2021.01); *H01M 50/46* (2021.01); *H01M 2004/027* (2013.01); *H01M 2220/20* (2013.01)

(58) Field of Classification Search
CPC ..................................................... H01M 4/131
See application file for complete search history.

(56) References Cited

U.S. PATENT DOCUMENTS

| | | | |
|---|---|---|---|
| 6,080,511 | A | 6/2000 | Kejha |
| 9,048,501 | B2 | 6/2015 | Kwon et al. |
| 9,118,084 | B2 | 8/2015 | Kwon et al. |

(Continued)

FOREIGN PATENT DOCUMENTS

| | | |
|---|---|---|
| CN | 104303335 | 1/2015 |
| EP | 2 854 197 | 4/2015 |

(Continued)

OTHER PUBLICATIONS

Definitions (Year: 2020).*

*Primary Examiner* — Brian R Ohara
(74) *Attorney, Agent, or Firm* — Oblon, McClelland, Maier & Neustadt, L.L.P.

(57) ABSTRACT

According to one embodiment, an electrode structure is provided. The electrode structure includes an electrode and a separator. The electrode includes an active material-containing layer. The active material-containing layer contains active material particles. The separator includes a layer of organic fibers and inorganic solid particles. The layer of organic fibers is on the active material containing layer. The inorganic solid particles are on the layer of organic fibers. The inorganic solid particles are disposed so as to be biased to a surface side opposite to an electrode side of the separator.

15 Claims, 8 Drawing Sheets

(51) Int. Cl.
*H01M 10/44* (2006.01)
*H01M 4/02* (2006.01)

(56) References Cited

U.S. PATENT DOCUMENTS

| | | | |
|---|---|---|---|
| 9,130,236 B2 | 9/2015 | Kwon et al. | |
| 2002/0164530 A1* | 11/2002 | Iwakura | H01M 2/16 429/229 |
| 2007/0231693 A1* | 10/2007 | Inagaki | H01M 4/485 429/231.1 |
| 2012/0015228 A1 | 1/2012 | Yoon et al. | |
| 2013/0034766 A1* | 2/2013 | Kim | H01M 8/1025 429/105 |
| 2013/0236766 A1 | 9/2013 | Seo et al. | |
| 2014/0295285 A1 | 10/2014 | Lee et al. | |
| 2015/0162584 A1 | 6/2015 | Uematsu et al. | |
| 2015/0243976 A1* | 8/2015 | Otsuki | H01M 10/345 428/687 |
| 2015/0249243 A1* | 9/2015 | Nagino | H01M 10/052 429/144 |
| 2015/0270522 A1 | 9/2015 | Yamada et al. | |
| 2016/0111698 A1 | 4/2016 | Lee et al. | |
| 2016/0204406 A1* | 7/2016 | Ryu | H01M 2/145 429/144 |
| 2018/0277908 A1 | 9/2018 | Sasakawa et al. | |

FOREIGN PATENT DOCUMENTS

| | | |
|---|---|---|
| JP | 11-329393 | 11/1999 |
| JP | 2009-70605 | 4/2009 |
| JP | 5938523 | 6/2016 |
| JP | 5988342 | 9/2016 |
| JP | 2017-059536 | 3/2017 |
| WO | WO 2013/176276 | 11/2013 |
| WO | WO 2014/017567 A1 | 1/2014 |
| WO | WO2014/046094 | 3/2014 |
| WO | WO 2014/049949 A1 | 4/2014 |
| WO | WO 2015/140902 | 9/2015 |

* cited by examiner

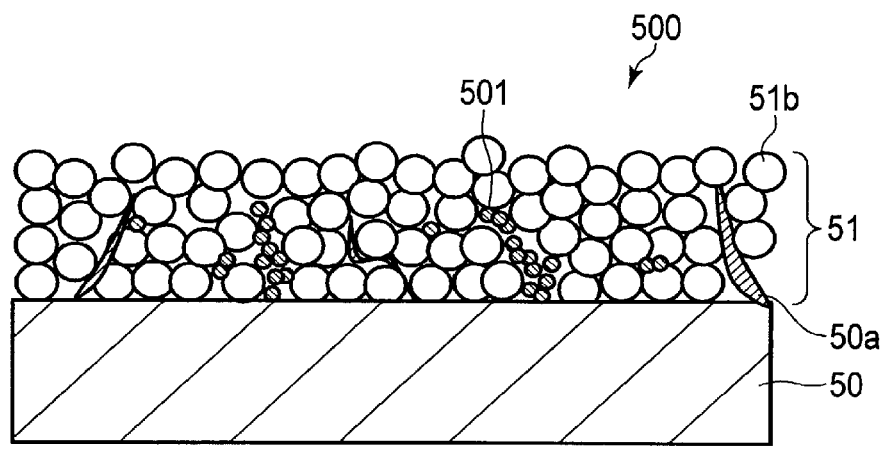
F I G. 1
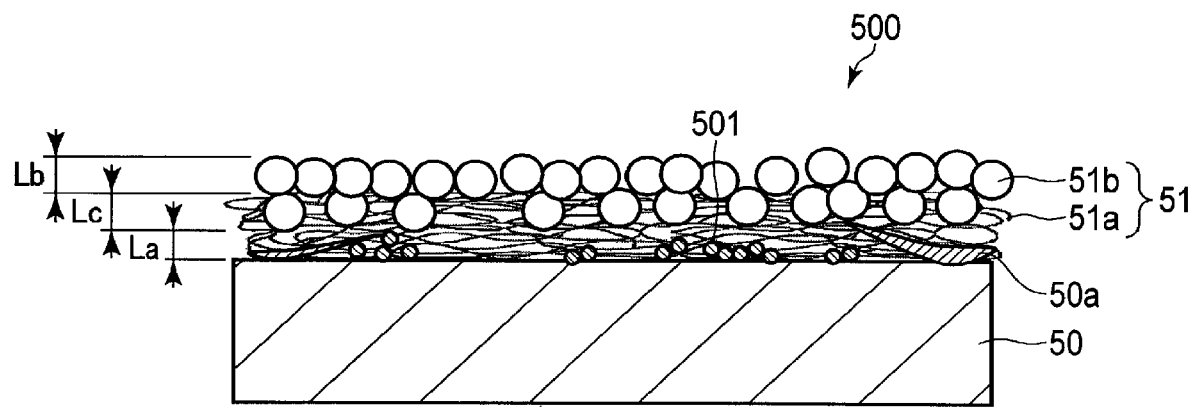
F I G. 2

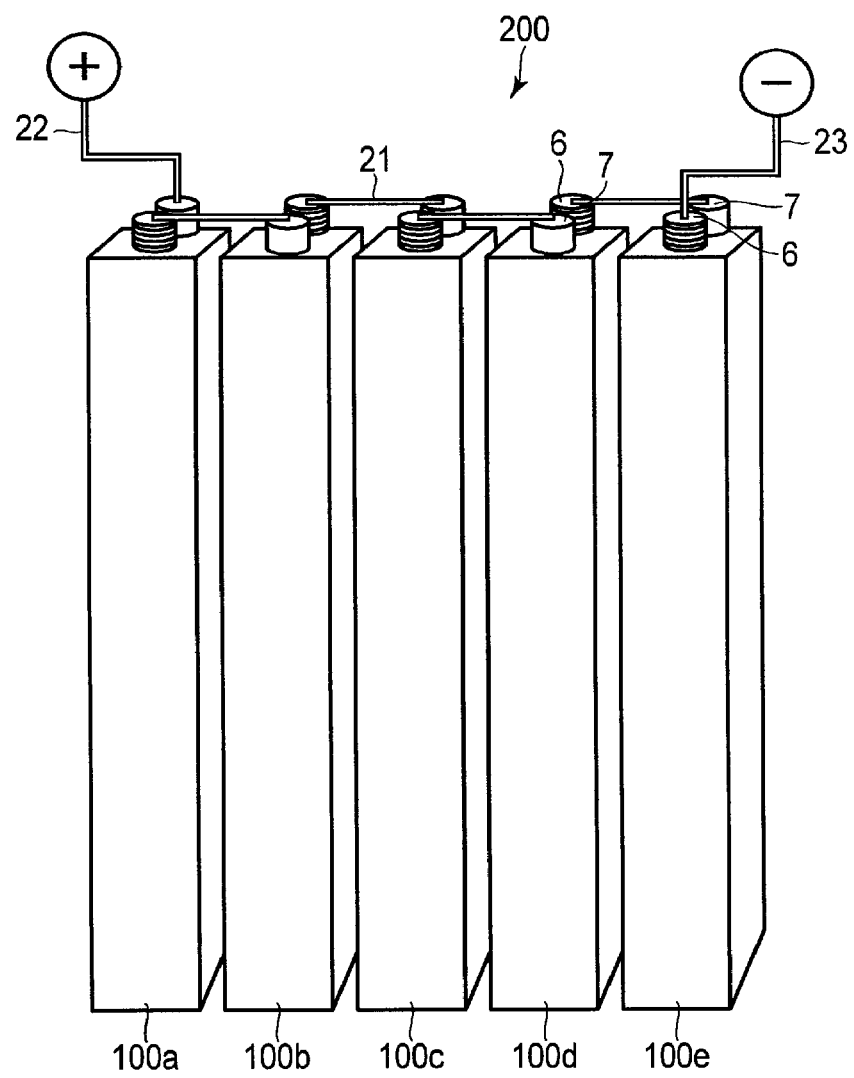
F I G. 10

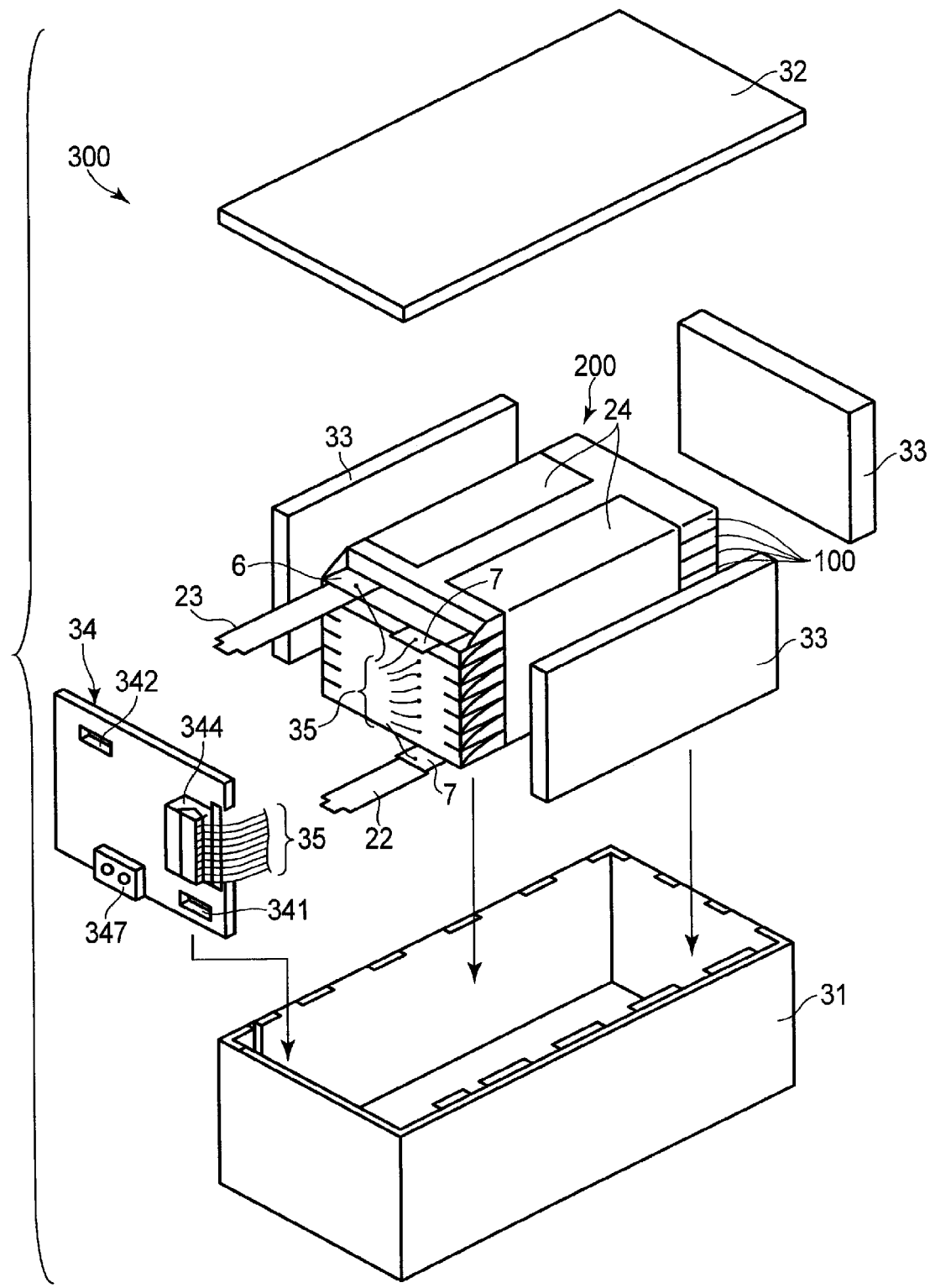
F I G. 11

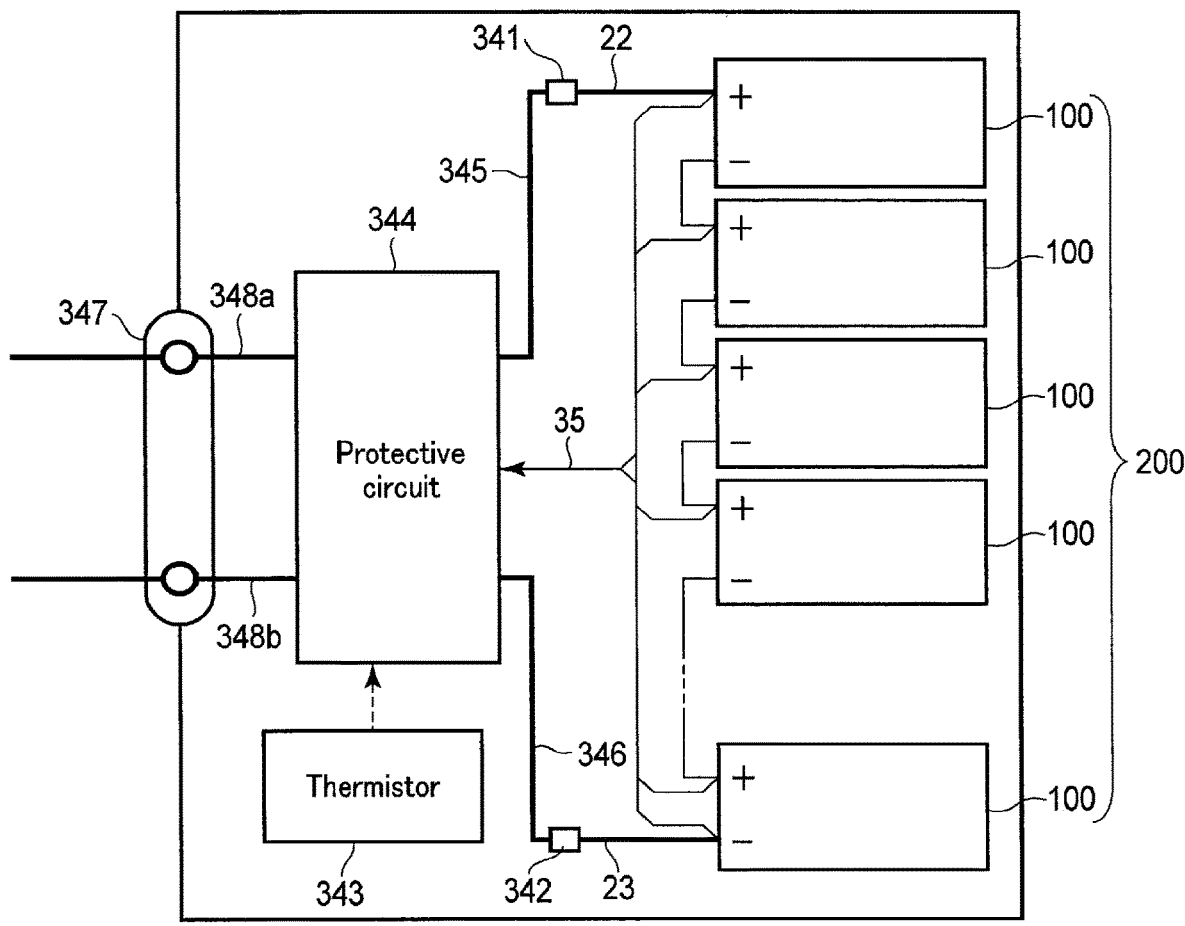
F I G. 12
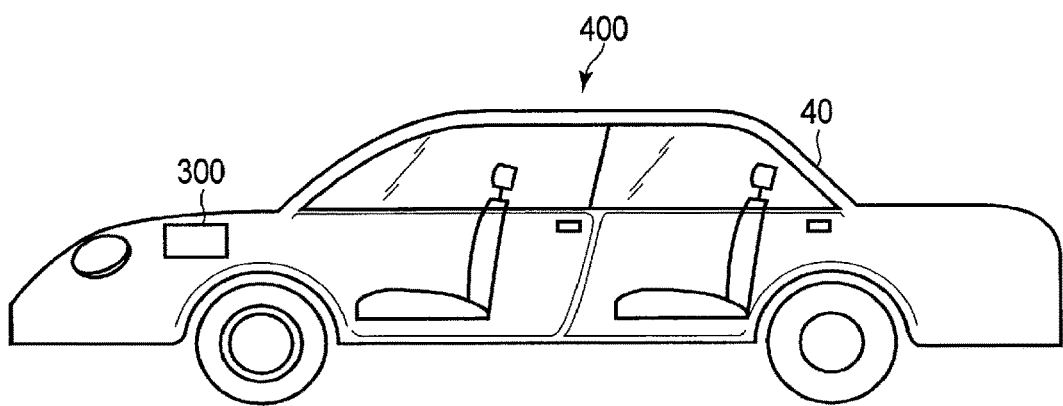
F I G. 13

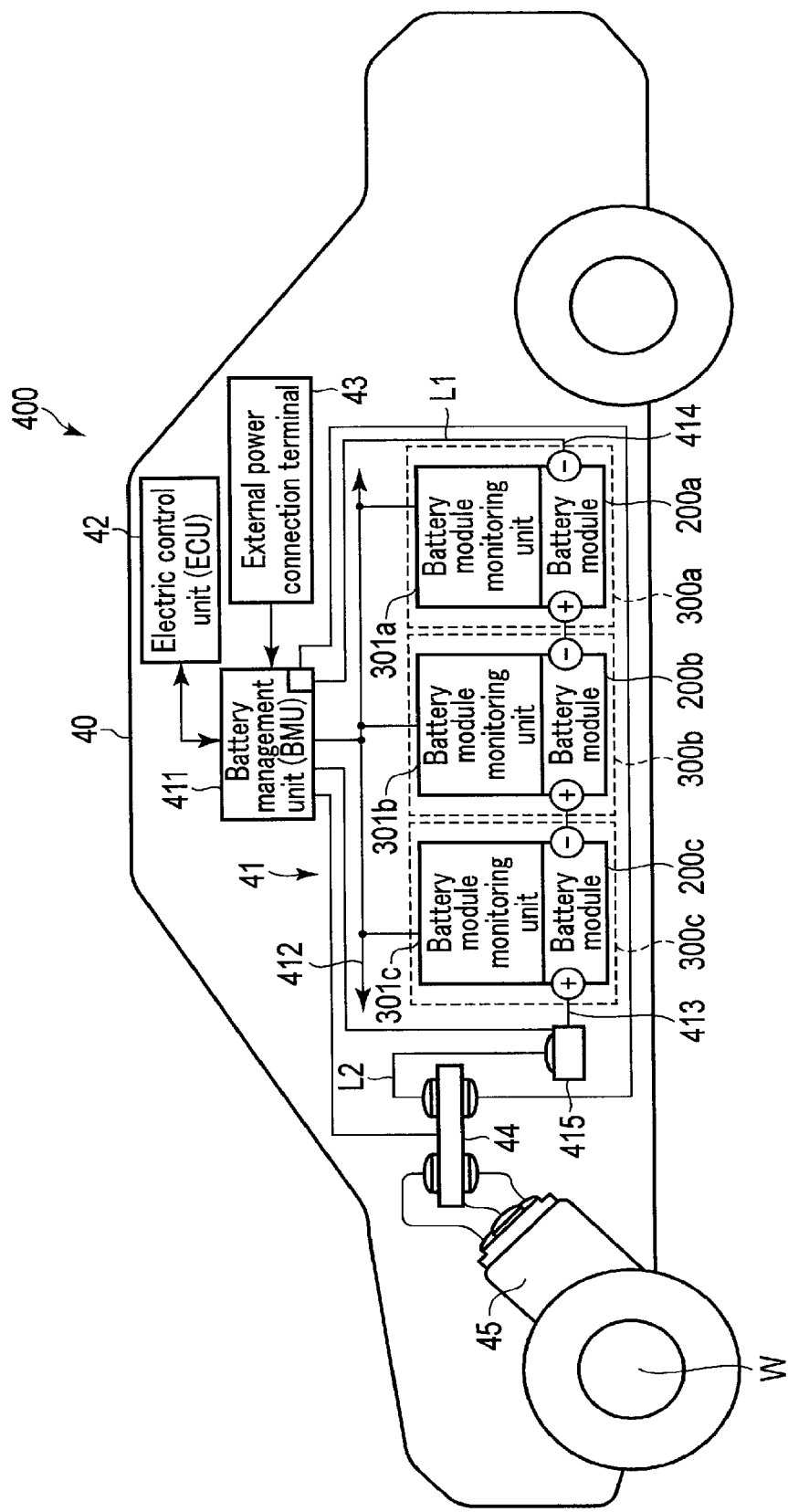
F I G. 14

ELECTRODE STRUCTURE, SECONDARY BATTERY, BATTERY PACK, AND VEHICLE

CROSS-REFERENCE TO RELATED APPLICATIONS

This application is based upon and claims the benefit of priority from Japanese Patent Application No. 2017-179313, filed Sep. 19, 2017, the entire contents of which are incorporated herein by reference.

FIELD

Embodiments described herein relate generally to an electrode structure, a secondary battery, a battery pack, and a vehicle.

BACKGROUND

A lithium ion secondary battery is widely used as a power supply for an electronic device or an onboard power supply. A secondary battery such as a lithium ion secondary battery includes a negative electrode and a positive electrode which are electrodes, a separator, and an electrolyte. Each electrode includes a current collector, and an active material-containing layer provided on the current collector. The active material-containing layer contains active material particles.

The separator is located between the pair of electrodes and prevents the electrodes from coming into contact with each other and causing an internal short circuit. As the separator, for example, a self-supporting film such as a nonwoven fabric or a porous film is used. In addition, using, as the separator, a self-supporting film obtained by forming the inorganic solid particles of a solid electrolyte or the like into a thin plate shape is also examined. However, since such a self-supporting film type separator needs a mechanical strength to some extent, it is difficult to decrease the film thickness. For this reason, when the self-supporting film type separator is used, the energy density of the secondary battery can hardly be raised.

So, use of an electrode-integrated type separator is examined. As the electrode-integrated type separator, for example, an aggregate of organic fibers formed by directly depositing the organic fibers on an active material-containing layer, an inorganic solid particle film formed by applying a slurry containing inorganic solid particles onto an active material-containing layer and drying it, or the like can be used. The electrode-integrated type separator is directly formed on the active material-containing layer by the above-described method, and therefore, does not need the mechanical strength. For this reason, the film thickness of the electrode-integrated type separator can be made smaller than the film thickness of the self-supporting film type separator.

BRIEF DESCRIPTION OF THE DRAWINGS

FIG. 1 is a sectional view schematically showing an example of a conventional electrode structure;

FIG. 2 is a sectional view schematically showing an example of the electrode structure according to the first embodiment;

FIG. 10 is a perspective view schematically showing an example of the battery module according to the third embodiment;

FIG. 11 is an exploded perspective view schematically showing an example of the battery pack according to the fourth embodiment;

FIG. 12 is a block diagram showing an example of an electric circuit of the battery pack shown in FIG. 11;

FIG. 13 is a cross-sectional view schematically showing an example of a vehicle according to the fifth embodiment; and FIG. 14 is a view schematically showing another example of the vehicle according to the fifth embodiment.

DETAILED DESCRIPTION

Figure 3:
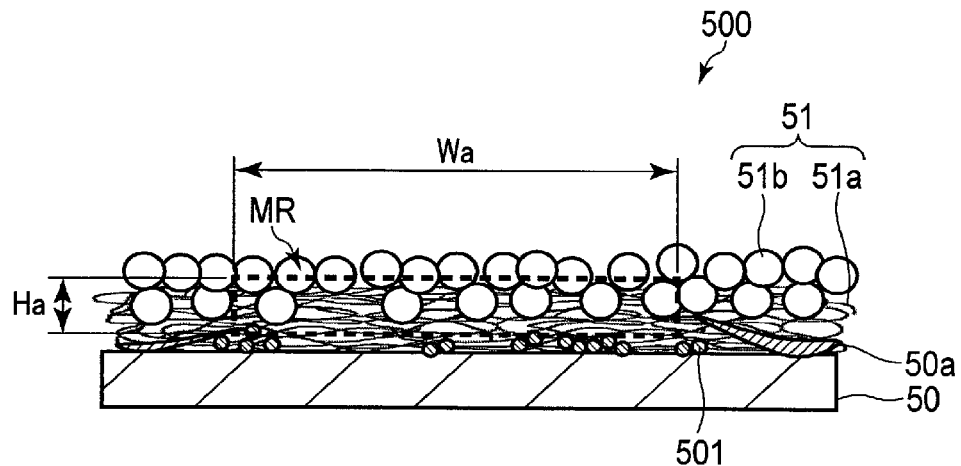
FIG. 3 is an explanatory view for explaining an example of the measurement region.

According to one embodiment, an electrode structure is provided. The electrode structure includes an electrode and a separator. The electrode includes an active material-containing layer. The active material-containing layer contains active material particles. The separator includes a layer of organic fibers and inorganic solid particles. The layer of organic fibers is on the active material containing layer. The inorganic solid particles are on the layer of organic fibers. The inorganic solid particles are disposed so as to be biased to a surface side opposite to an electrode side of the separator.

According to another embodiment, an secondary battery is provided. The secondary battery includes an electrode structure according to the embodiment, an electrode facing the electrode structure; and an electrolyte.

According to another embodiment, a battery pack is provided. The battery pack includes the secondary battery according to the embodiment.

According to another embodiment, a vehicle is provided. The vehicle includes the battery pack according to the embodiment.

As described above, since the electrode-integrated type separator need not increase the mechanical strength, its film thickness can be made small. However, when the electrode-integrated type separator is used, a portion of the active material-containing layer is sometimes mixed into the separator. If the film thickness of the separator is small, the portion of the active material containing layer mixed into the separator appears to the surface layer, resulting in an internal short circuit.

This problem will be described in more detail with reference to FIG. 1. FIG. 1 is a sectional view schematically showing an example of a conventional electrode structure. An electrode structure 500 shown in FIG. 1 includes an electrode 50 and a separator 51. The separator 51 is formed from a plurality of inorganic solid particles 51b. The separator 51 is an electrode-integrated type separator provided by directly applying a slurry containing the inorganic solid particles 51b onto the active material containing layer of the electrode 50 and drying it.

The surface of the active material containing layer of the electrode 50 sometimes has fine unevenness (although not shown). If the active material-containing layer has such unevenness, portions of the active material-containing layer tend to readily peel off at convex portions. In addition, the electrode structure 500 can be formed by forming the electrode-integrated type separator 51 and, after that, cutting the electrode 50 into a predetermined shape. At this time, the surface of the active material-containing layer tends to readily peel off at end portions having cut surfaces. A portion 50a of the active material-containing layer peeled from the electrode 50 and a conductive agent 501 that can be contained in the active material-containing layer enter the gaps between the inorganic solid particles 51b in some cases, as shown in FIG. 1. If at least one of the portion 50a and the conductive agent 501 of the active material-containing layer reaches the surface layer of the separator 51, it readily comes into contact with the counter electrode, and an internal short circuit readily occurs.

For the above-described reason, when an electrode-integrated type separator made of inorganic solid particles is used, to prevent such a short circuit, the film thickness of the separator 51 needs to be increased to prevent at least one of the portion 50a and the conductive agent 501 of the active material containing layer from reaching the surface layer of the separator 51.

This problem can be solved by using, as the electrode-integrated type separator, not a film made of the inorganic solid particles 51b but a layer of organic fibers formed by directly depositing the organic fibers on the active material-containing layer. That is, the layer of organic fibers can contain one or more string-shaped organic fibers. Since the contact area of such string-shaped organic fibers is large as compared to the contact area of the inorganic solid particles, it is believed that peeling of portions of the active material-containing layer and their penetration into the separator can be suppressed.

However, if the layer of organic fibers have many voids, portions of the active material-containing layer may enter the voids and reach the surface layer of the separator. Hence, even when the electrode-integrated type separator formed from the layer of organic fibers is used, there is room for improvement concerning suppression of an internal short circuit.

First Embodiment

According to the first embodiment, an electrode structure is provided. The electrode structure includes an electrode and a separator. The electrode includes an active material-containing layer. The active material-containing layer contains active material particles. The separator includes a layer of organic fibers, and inorganic solid particles. The inorganic solid particles are supported on the layer of organic fibers. The inorganic solid particles are disposed so as to be biased to the surface side opposite to the electrode side of the separator (to be sometimes referred to as "surface side" hereinafter for the descriptive convenience).

In the separator included in the electrode structure according to the first embodiment, the existence ratio of inorganic solid particles included in the layer of organic fibers on the surface side and deposited on the layer of organic fibers is higher than the existence ratio of inorganic solid particles included in the layer of organic fibers on the electrode side. If a larger number of inorganic solid particles exist on the surface side of the separator than on the electrode side, as described above, peeling of the active material-containing layer can be suppressed, and reaching of peeled portions of the active material-containing layer to the surface layer of the separator can be suppressed. Hence, in the electrode structure according to the first embodiment, a short circuit caused by peeling of the active material containing layer hardly occurs. For this reason, in the electrode structure according to the first embodiment, the thickness of the separator can be decreased. Accordingly, a battery including the electrode structure according to the first embodiment can implement a high capacity and reduction of the weight and cost.

FIG. 2 is a sectional view schematically showing an example of the electrode structure according to the first embodiment. An electrode structure 500 shown in FIG. 2 is the same as the conventional electrode structure 500 shown in FIG. 1 except that a separator 51 includes a layer 51a of organic fibers, and a plurality of inorganic solid particles 51b are arranged on the surface side of the layer 51a of organic fibers.

The separator 51 shown in FIG. 2 can be divided into three layers, that is, a surface-side layer Lb opposite to the electrode side, an electrode-side layer La that faces the surface-side layer Lb and is in contact with the active material-containing layer of an electrode 50, and an intermediate layer Lc located between the surface-side layer Lb and the electrode-side layer La. In the separator 51 shown in FIG. 2, the electrode-side layer La includes the layer 51a of organic fibers. The surface-side layer Lb includes the layer 51a of organic fibers and the inorganic solid particles 51b supported on the layer 51a of organic fibers. The intermediate layer Lc includes the layer 51a of organic fibers and the inorganic solid particles 51b supported on the layer 51a of organic fibers.

As is apparent from FIG. 2, many inorganic solid particles 51b exist in the surface-side layer Lb, but the inorganic solid particles 51b rarely exist in the electrode-side layer La. That is, the existence ratio of the inorganic solid particles 51b in the surface-side layer Lb is higher than the existence ratio of the inorganic solid particles 51b in the electrode-side layer La. When this arrangement is employed, the layer 51a of organic fibers contacts the surface of the electrode 50, and peeling of the active material-containing layer can thus be suppressed. In addition, the inorganic solid particles 51b located on the surface side of the separator 51 can close gaps in the layer 51a of organic fibers. It is therefore possible to suppress penetration of a portion 50a and a conductive agent 501 of the active material-containing layer through the layer 51a of organic fibers and reaching to the surface layer of the separator 51. Additionally, if a portion of the active material-containing layer peels off in the counter electrode facing the electrode 50, entering of the portion into the separator 51 can be suppressed. Hence, the electrode structure 500 shown in FIG. 2 can suppress peeling of the active material-containing layer so an internal short circuit hardly occurs as compared to the electrode structure shown in FIG. 1.

Details of the electrode and the separator included in the electrode structure according to the first embodiment will be described below.

(Electrode)

The electrode can include a current collector and an active material-containing layer. The active material-containing layer can be formed on one surface or each surface of the current collector. The active material-containing layer can contain active material particles, and optionally, a conductive agent and a binder. The electrode can be either a negative electrode or a positive electrode. That is, the electrode structure according to the first embodiment can be a negative electrode structure or a positive electrode structure.

(Negative Electrode)

The negative electrode can include a negative electrode current collector and an negative electrode active material-containing layer. The negative electrode active material-containing layer can be formed on one surface or both of reverse surfaces of the negative electrode current collector. The negative electrode active material-containing layer can include an negative electrode active material, and optionally a conductive agent and a binder.

The negative electrode current collector is a material which is electrochemically stable at the insertion and extraction potentials of lithium ions of the negative electrode active material. For example, the negative electrode current collector is preferably made of copper, nickel, stainless, aluminum, or an aluminum alloy containing one or more elements selected from Mg, Ti, Zn, Mn, Fe, Cu, and Si. The thickness of the current collector is preferably 5 μm to 20 μm. The current collector having such a thickness can achieve a balance between the strength and reduction in weight of the electrode.

The current collector can include a portion on one side where the negative electrode active material-containing layer is not carried on any surfaces. This portion acts as a negative electrode current collector tab.

As the negative electrode active material, it is preferable to use a compound whose lithium ion insertion/extraction potential is 1.0 V (vs. Li/Li$^+$) to 3.0 V (vs. Li/Li$^+$) with respect to a potential based on metallic lithium.

Examples of the negative electrode active material include a lithium titanate having a ramsdellite structure (for example, Li$_{2+y}$Ti$_3$O$_7$ (0≤y≤3), a lithium titanate having a spinel structure (for example, Li$_{4+x}$Ti$_5$O$_{12}$ (0≤x≤3)), monoclinic titanium dioxide (TiO$_2$), anatase type titanium dioxide, rutile type titanium dioxide, a hollandite type titanium composite oxide, an orthorhombic titanium composite oxide, a monoclinic niobium-titanium composite oxide.

Examples of the orthorhombic titanium composite oxide include a compound represented by a general formula of Li$_{2+a}$M(I)$_{2-b}$Ti$_{6-c}$M(II)$_d$O$_{14+\sigma}$, M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, 0≤a≤6, 0≤b<2, 0≤c<6, 0≤d<6, −0.5≤δ≤0.5. Specific examples of the orthorhombic titanium composite oxide include Li$_{2+a}$Na$_2$Ti$_6$O$_{14}$.

Examples of the monoclinic niobium-titanium composite oxide include a compound represented by a general formula Li$_x$Ti$_{1-y}$M1$_y$Nb$_{2-z}$M2$_z$O$_{7\pm\sigma}$. M1 is at least one element selected from the group consisting of Zr, Si, and Sn. M2 is at least one element selected from the group consisting of V, Ta, and Bi. In the general formula, 0≤x≤5, 0≤y<1, 0≤z<2, −0.3≤δ≤0.3. Specific examples of the monoclinic niobium-titanium composite oxide include Li$_x$Nb$_2$TiO$_7$.

Other examples of the monoclinic niobium-titanium composite oxide include a compound represented by a general formula Ti$_{1-y}$M3$_{y+z}$Nb$_{2-z}$O$_{7-\sigma}$. M3 is at least one element selected from the group consisting of Mg, Fe, Ni, Co, W, Ta and Mo. In the general formula, 0≤y<1, 0≤z<2, −0.3≤δ≤0.3.

The primary particle size of the negative electrode active material is preferably within a range of from 1 nm to 1 μm. The negative electrode active material having a primary particle size of 1 nm or more is easy to handle during industrial production. In the negative electrode active material having a primary particle size of 1 μm or less, diffusion of lithium ions within solid can proceed smoothly.

The specific surface area of the negative electrode active material is preferably within a range of from 3 m$^2$/g to 200 m$^2$/g. The negative electrode active material having a specific surface area of 3 m$^2$/g or more can secure sufficient sites for inserting and extracting Li ions. The negative electrode active material having a specific surface area of 200 m$^2$/g or less is easy to handle during industrial production, and can secure a good charge and discharge cycle performance.

The conductive agent is blended to improve current collection performance and to suppress the contact resistance between the active material and the current collector. Examples of the conductive agent include carbonaceous materials such as vapor grown carbon fiber (VGCF), acetylene black, carbon black, and graphite. One of these may be used as the conductive agent, or two or more thereof may be used in combination as the conductive agent. Alternatively, in place of using the conductive agent, a carbon coating or an electron conductive inorganic material coating may be applied to the surfaces of the active material particles.

The binder is blended to fill the gaps of the dispersed active material with the binder and also to bind the active material and the negative electrode current collector. Examples of the binder include polytetrafluoro ethylene (PTFE), polyvinylidene fluoride (PVdF), fluorine-containing rubber, styrene-butadiene rubber, a polyacrylic acid compound, an imide compound, carboxymethyl cellulose (CMC) and salts of the CMC. One of these may be used as the binder, or two or more thereof may be used in combination as the binder.

In the active material-containing layer, active material, binder, and conductive agent are preferably blended in proportions of 68% by mass to 96% by mass, 2% by mass to 30% by mass, and 2% by mass to 30% by mass, respectively. The content of the conductive agent of 2% by mass or more makes it possible to improve the current collection performance of the active material-containing layer. The amount of the binder of 2% by mass or more provides sufficient binding property between the active material-containing layer and the current collector, which can provide promising excellent cycle performance. On the other hand, the contents of the conductive agent and binder are preferably 30% by mass or less, thereby increasing the capacity.

The negative electrode may be produced by the following method, for example. First, an active material, a conductive agent, and a binder are suspended in a solvent to prepare a slurry. The slurry is applied onto one surface or both of reverse surfaces of a current collector. Next, the applied slurry is dried to form a layered stack of the active material-containing layer and the current collector. Then, the layered stack is subjected to pressing. The electrode can be produced in this manner.

Alternatively, the electrode may also be produced by the following method. First, an active material, an conductive agent, and a binder are mixed to obtain a mixture. Next, the mixture is formed into pellets. Then the electrode can be obtained by arranging the pellets on the current collector.

The density of the negative electrode active material-containing layer (the current collector is not included) is preferably 1.8 g/cm$^3$ to 2.8 g/cm$^3$. The negative electrode in which the density of the negative electrode active material-containing layer falls within this range is excellent in the energy density and the electrolyte holding properties. The density of the negative electrode active material-containing layer is more preferably 2.1 g/cm$^3$ to 2.6 g/cm$^3$.

(Positive Electrode)

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector can include a portion on one side where the positive electrode active material-containing layer is not carried on any surfaces. This portion acts as a positive electrode current collector tab.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having Li (lithium) and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When an room temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with room temperature molten salts, cycle life can be improved. The room temperature molten salt will be described later in detail.

The primary particle size of the positive electrode active material is preferably within a range of from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably within a range of from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carbokymethyl cellulose (CMC), and salts of the CMC. One of these may be used as the binder, or two or more may be used in combination as the binder.

The conductive agent is added to improve a current collection performance and to suppress the contact resistance between the active material and the current collector. Examples of the conductive agent include carbonaceous substances such as vapor grown carbon fiber (VGCF), acetylene black, carbon black, and graphite. One of these may be used as the conductive agent, or two or more may be used in combination as the conductive agent. The conductive agent may be omitted.

In the positive electrode active material containing layer, the positive electrode active material and the binder are preferably mixed at a ratio of 80 mass % to 98 mass % and a ratio of 2 mass % to 20 mass %, respectively.

When the amount of the binder is set to 2 mass % or more, a sufficient electrode strength can be obtained. In addition, the binder can function as an insulator. For this reason, when the amount of the binder is set to 20 mass % or less, the amount of the insulator contained in the electrode decreases, and therefore, the internal resistance can be reduced.

When adding the conductive agent, the positive electrode active material, the binder, and the conductive agent are preferably mixed at a ratio of 77 mass % to 95 mass %, a ratio of 2 mass % to 20 mass %, and a ratio of 3 mass % to 15 mass %, respectively.

When the amount of the conductive agent is set to 3 mass % or more, the above-described effect can be obtained. When the amount of the conductive agent is set to 15 mass % or less, the ratio of the conductive agent that comes into contact with the electrolyte can be lowered. If this ratio is low, the decomposition of the electrolyte can be reduced under high-temperature storage.

The positive electrode can be produced in accordance with, for example, the same procedure as that of the above-described negative electrode.

(Separator)

The separator is provided directly on the active material-containing layer of the electrode. When the active material-containing layer is provided on each surface of the current collector, the separator may be provided on one active material-containing layer or may be provided on each active material-containing layer.

The layer of organic fibers is an aggregate of organic fibers deposited on the active material-containing layer of the electrode. The layer of organic fibers may be directly provided on the active material-containing layer. The layer of organic fibers contains one or more organic fibers. The layer of organic fibers can have a three-dimensional reticulated structure in which one organic fiber or a plurality of organic fibers cross in a reticulated shape.

The organic fiber contains at least one organic material selected from the group consisting of, for example, polyamide-imide, polyamide, polyolefin, polyether, polyimide, polyketone, polysulfone, cellulose, polyvinyl alcohol (PVA), and polyvinylidene fluoride (PVdF). As the polyolefin, for example, polypropylene (PP), polyethylene (PE), or the like is usable. The polyimide and PVdF are generally said to be materials that can hardly change to fibers. When an electrospinning method to be described later is employed, such a material can also be changed to fibers to form a layer. One type or two or more types of organic fibers can be used. As the organic material, at least one of polyamide-imide and PVdF is preferably contained.

In the organic fiber, the sectional shape in a direction orthogonal to the longitudinal direction is not particularly limited. The sectional shape of the organic fiber can be circular, elliptic, or triangular. Alternatively, the sectional shape may be a polygonal shape with four or more vertices.

In the organic fiber, the average diameter of sections in the direction orthogonal to the longitudinal direction, that is, the thickness of the organic fiber preferably ranges from 10 nm to 500 nm. If the thickness of the organic fiber falls within this range, the ionic conductivity and the electrolyte impregnating ability of the separator tend to improve. The thickness of the organic fiber more preferably ranges from 30 nm to 400 nm. The thickness of the organic fiber can be measured by SEM (Scanning Electron Microscopy) observation.

The average length per organic fiber is, for example, 700 μm or more, and preferably 1 mm or more. If the length of the organic fiber is large, peeling of the active material-containing layer tends to more hardly occur. The length of the organic fiber does not particularly have an upper limit value. For example, the upper limit value of the length is 10 mm. The length of the organic fiber can be measured by SEM observation.

The mass of the organic fibers per unit area of the active material-containing layer preferably ranges from $1 \times 10^{-5}$ g/cm$^2$ to $5 \times 10^{-3}$ g/cm$^2$. If the weight of the organic fibers per unit area falls within this range, the ionic conductivity and the electrolyte impregnating ability of the separator tend to improve. The weight of the organic fibers per unit area more preferably ranges from $1 \times 10^{-4}$ g/cm$^2$ to $1 \times 10^{-3}$ g/cm$^2$. The weight of the organic fibers per unit area can be measured by SEM observation.

The inorganic solid particles are supported on the layer of organic fibers. The inorganic solid particles are unevenly distributed so that many inorganic solid particles exist on the surface side of the layer of organic fibers, as compared to the electrode side of the layer of organic fibers. The inorganic solid particles may be located inside the layer of organic fibers or may be located on the layer of organic fibers. In addition, some inorganic solid particles may be located inside, and the remaining inorganic solid particles may be located on the layer of organic fibers. The inorganic solid particles preferably exist so as to fill some voids in the layer of organic fibers.

The uneven distribution of the inorganic solid particles on the surface side in the separator can be confirmed by, for example, the following method. First, the battery is disassembled, and the electrode structure is extracted. Next, a portion of a region except the ends of the electrode structure is cut, and a test piece including a section of the electrode structure in the thickness direction is obtained. Next, the test piece is set in an ion milling apparatus, and the section of the electrode structure in the thickness direction is smoothly processed to obtain a processed surface. Then, to impart electron conductivity to the separator, an electron conductive material is deposited on the section of the electrode structure in the thickness direction by vapor deposition or sputtering, thereby obtaining an observation surface. As the electron conductive material, for example, carbon or a metal such as palladium or a gold-palladium alloy can be used. Next, the observation surface is observed by a SEM.

Next, a measurement region used to measure the existence ratio of the inorganic solid particles is defined on the observation surface. FIG. 3 is an explanatory view for explaining an example of the measurement region. A portion surrounded by the dotted line shown in FIG. 3 is a measurement region MR. As shown in FIG. 3, the measurement region MR has a rectangular shape having a width Wa that is the length in a direction parallel to the main surface of the electrode, a lower end defined by the main surface of the electrode, and a height Ha that is the height in a direction orthogonal to the main surface. The main surface of the electrode is a surface along a direction orthogonal to a direction along the thickness of the electrode. The width Wa is three or more times larger than the height Ha. In the section of the separator on the observation surface, when the height of a portion whose distance from the main surface of the electrode is longest is defined as 1, the height Ha is set to 0.95 or more. The height Ha is set to, for example, 13.58 μm.

Figure 4:
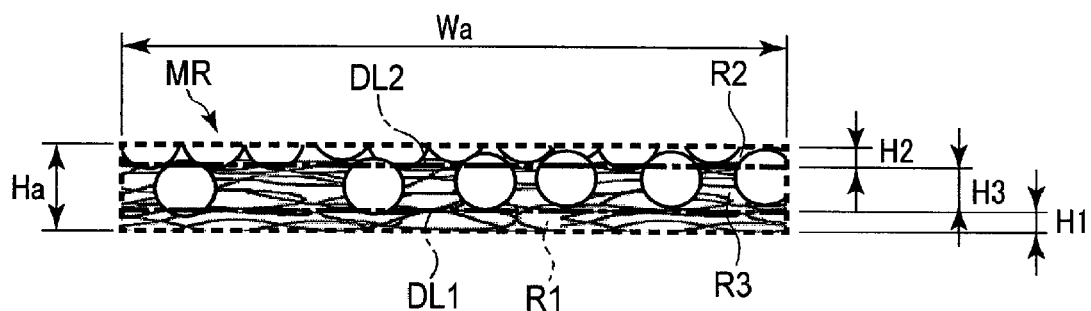
FIG. 4 is an enlarged sectional view of the measurement region shown in FIG. 3.

Next, as shown in FIG. 4, the measurement region MR is divided into three regions, that is, an electrode-side region R1, a surface-side region R2, and an intermediate region R3 along two parting lines DL1 and DL2 parallel to the long side of the measurement region MR. FIG. 4 is an enlarged sectional view of the measurement region shown in FIG. 3.

The electrode-side region R1 is a region located closest to the electrode (active material containing layer) in the three regions. For example, in the height Ha of the measurement region MR, when the position of the long side of the measurement region MR located on the electrode side is defined as 0%, and the position of the long side of the measurement region MR located on the surface side is defined as 100%, a height H1 of the electrode-side region R1 is a height from 0% to 5%. The area of the electrode-side region R1 is obtained from the product of the width Wa and the height H1.

The surface-side region R2 is a region located closest to the surface in the three regions. For example, in the height Ha of the measurement region MR, when the position of the long side of the measurement region MR located on the electrode side is defined as 0%, and the position of the long side of the measurement region MR located on the surface side is defined as 100%, a height H2 of the surface-side region R2 is a height from 90% to 100%. The area of the surface-side region R2 is obtained from the product of the width Wa and the height H2.

The intermediate region R3 is a region located between the electrode-side region R1 and the surface-side region R2. The intermediate region R3 is typically larger than each of the electrode-side region R1 and the surface-side region R2.

In the height Ha of the measurement region MR, when the position of the long side of the measurement region MR located on the electrode side is defined as 0%, and the position of the long side of the measurement region MR located on the surface side is defined as 100%, a height H3 of the intermediate region R3 is a height from 5% to 90%. The area of the intermediate region R3 is obtained from the product of the width Wa and the height H3. The ratio of the area of the electrode-side region R1, the area of the surface-side region R2, and the area of the intermediate region R3 is, for example, 5:10:85.

Next, in each of the three divided regions, the area of the section of the inorganic solid particles is calculated using image analysis software or the like. This measurement is performed at three different positions of the electrode, and the average value is obtained as the area of the inorganic solid particles in each divided region. Next, a ratio A of the area of the inorganic solid particles to the total area of the electrode-side region R1, a ratio B of the area of the inorganic solid particles to the total area of the surface-side region R2, and a ratio C of the area of the inorganic solid particles to the total area of the intermediate region R3 are calculated.

In the separator included in the electrode structure according to the first embodiment, the ratio B of the area of the inorganic solid particles in the surface-side region R2 is higher than the ratio A of the area of the inorganic solid particles in the electrode-side region R1. If the ratio B is higher than the ratio A, the inorganic solid particles can be considered to exist while being unevenly distributed on the surface side in the separator.

In addition, the ratio B is preferably higher than the ratio C of the area of the inorganic solid particles in the intermediate region R3. If the ratio B is higher than the ratio C, the internal short circuit of the battery is more difficult to occur. Furthermore, the ratio B is preferably higher than the sum of the ratios A and C.

In addition, the ratio A is preferably lower than the ratio C. If the ratio A is lower than the ratio C, the internal short circuit of the battery is more difficult to occur.

In the separator, it is particularly preferable that the ratio B is higher than the ratio C, and the ratio C is higher than the ratio A. Such a separator can be said to raise the existence ratio of the inorganic solid particles from the electrode side to the surface side. When the separator has such an arrangement, a portion of the active material-containing layer tends to be more difficult to reach the surface layer of the separator, and the internal short circuit of the battery tends to be more difficult to occur.

A ratio A/B of the ratios A and B is preferably 0.11 or less, more preferably 0.09 or less, and much more preferably 0.07 or less. If the ratio A/B is low, the inorganic solid particles can be said to be more unevenly distributed on the surface side in the separator. The lower limit value of the ratio A/B is, for example, 0.

A ratio A/C of the ratios A and C preferably ranges from 0 to 0.22. If the ratio A/C falls within this range, the internal short circuit of the battery tends to be more difficult to occur. The ratio A/C more preferably ranges from 0 to 0.19.

A ratio B/C of the ratios B and C preferably ranges from 1.9 to 7.3. If the ratio B/C falls within this range, the internal short circuit of the battery tends to be more difficult to occur. The ratio B/C more preferably ranges from 2.05 to 3.6.

In the electrode-side region R1, the inorganic solid particles may be either present or absent. The ratio A of the area of the inorganic solid particles to the total area of the electrode-side region R1 is preferably, for example, 10% or less, more preferably 8% or less, and much more preferably 5% or less. If the ratio A is low, the mass of the separator lowers, and the mass energy density of the battery can be raised. The lower limit value of the ratio A in the electrode-side region R1 is, for example, 0%.

In the surface-side region R2, the inorganic solid particles exist. The ratio B of the area of the inorganic solid particles to the total area of the surface-side region R2 is preferably, for example, 50% or more, more preferably 60% or more, and much more preferably 70% or more. If the ratio B is high, the internal short circuit of the battery tends to be more difficult to occur. That is, the inorganic solid particles existing in the surface-side region R2 suppress appearance of a portion of the active material-containing layer to the surface layer of the separator. In addition, the inorganic solid particles existing in the surface-side region R2 suppress entering of a portion of the active material-containing layer, which peels off from the active material-containing layer of the counter electrode, into the separator. The upper limit value of the ratio B is, for example, 100%.

In the intermediate region R3, the inorganic solid particles may be absent but preferably exist. The ratio C of the area of the inorganic solid particles to the total area of the intermediate region R3 preferably ranges from 10% to 40%. If the ratio C falls within this range, the low mass of the separator and the difficulty of occurrence of the internal short circuit can be simultaneously implemented. That is, if the inorganic solid particles exist in the intermediate region R3, a peeled portion of the active material-containing layer hardly enters the surface-side region R2. On the other hand, if the inorganic solid particles excessively exist in the intermediate region R3, the mass of the separator tends to become high. The ratio C more preferably ranges from 20% to 40%.

Figure 5:
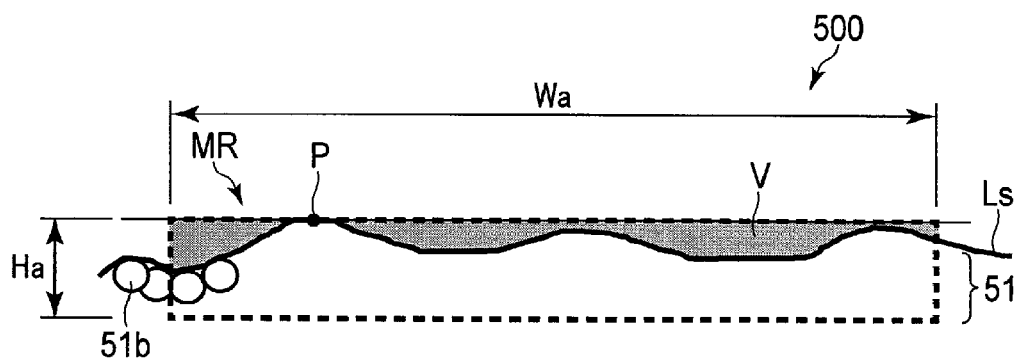
FIG. 5 is an explanatory view for explaining another example of the measurement region.

In the above-described method, as shown in FIG. 3, the measurement region MR that is wholly located in the separator is used. However, the measurement region MR may include an external region that is not the separator. This measuring method will be described with reference to FIG. 5. FIG. 5 is an explanatory view for explaining another example of the measurement region.

First, on the observation surface of the SEM, a point P that is located at a position farthest from the electrode in the separator is confirmed. Next, the measurement region MR is defined such that it has, as one side, a line that passes through the point P in a direction parallel to the main surface of the electrode. A portion surrounded by the dotted line shown in FIG. 5 represents the measurement region MR. Then, in the measurement region MR, the outermost surface of the separator 51 is confirmed. A solid line Ls shown in FIG. 5 schematically represents the surface of the separator 51. The surface of the separator 51 shown in FIG. 5 is formed by concatenation of the inorganic solid particles 51b. In FIG. 5, a region located on the upper side of the solid line Ls in the region surrounded by the dotted line and the solid line Ls represents an external region V that does not contain the organic fibers and the inorganic solid particles. In addition, a region located on the lower side of the solid line Ls represents the separator 51.

Next, the measurement region MR is divided into the regions R1 to R3 in accordance with the same procedure as the method described with reference to FIG. 4. Then, an area R2a obtained by excluding the area of the external region V from the total area of the surface-side region R2 is calculated. Next, the area of the inorganic solid particles in the area R2a is calculated, and the ratio B is obtained. In the electrode-side region R1 and the intermediate region R3 as well, if the external region V exists, areas R1a and R3a each obtained by excluding the area of the external region V from the total area are calculated. Next, the areas of the inorganic solid particles in the areas R1a and R3a are calculated, and the ratios A and C are obtained.

As the inorganic solid particles, for example, an oxide containing an element such as aluminum (Al), zirconium (Zr), titanium (Ti), scandium (Sc), yttrium (Y), lanthanum (La), calcium (Ca), strontium (Sr), barium (Ba), germanium (Ge), tin (Sn), or phosphorus (P) can be used, although the material is not particularly limited. Examples of the inorganic solid particles are alumina ($Al_2O_3$), zirconia ($ZrO_2$), and a mixture thereof. The same effect as described above can be obtained even when a metal oxide such as titanium oxide, niobium oxide, tantalum oxide, hafnium oxide, yttrium oxide, gallium oxide, or germanium oxide, a lanthanoid-based oxide such as lanthanum oxide, or the like is used as the inorganic solid particles.

As the inorganic solid particles, inorganic solid electrolyte particles are preferably used. When the inorganic solid electrolyte particles are used, the ionic conductivity of the separator tends to become high. The inorganic solid electrolyte particles preferably have a lithium ion conductivity of $1 \times 10^{-5}$ S/cm or more at 25° C.

The lithium ion conductivity can be measured by, for example, an AC impedance method. More specifically, first, the inorganic solid particles are molded using a tablet forming device, thereby obtaining a green compact. Next, gold (Au) is deposited on both surfaces of the green compact, thereby obtaining a measurement sample. Then, the AC impedance of the measurement sample is measured using an impedance measuring device. As the measuring device, for example, the frequency response analyzer 1260 available from Solartron can be used. The measurement is performed under an argon atmosphere by setting the measurement frequency to 5 Hz to 32 MHz and the measurement temperature to 25° C.

Next, a complex impedance plot is created based on the measured AC impedance. In the complex impedance plot, a real component is plotted along the abscissa, and an imaginary component is plotted along the ordinate. Next, an ionic conductivity $\sigma_{Li}$, of the inorganic solid particles is calculated by the following formula. In the following formula, $Z_{Li}$ is a resistance value calculated from the diameter of the arc of the complex impedance plot, S is the area of the measurement sample, and d is the thickness of the measurement sample.

$$\sigma_{Li} = (1/Z_{Li}) \times (d/S)$$

As the inorganic solid electrolyte, for example, an oxide-based solid electrolyte or a sulfide-based solid electrolyte can be used. As the oxide-based solid electrolyte, a lithium phosphate solid electrolyte having a NASICON (Sodium (Na) Super Ionic Conductor) structure and represented by a general formula $LiM_2(PO_4)_3$ is preferably used. M in the formula is at least one element selected from the group consisting of, for example, titanium (Ti), germanium (Ge), strontium (Sr), zirconium (Zr), tin (Sn), aluminum (Al), and calcium (Ca). The ionic conductivity of the lithium phosphate solid electrolyte represented by the general formula $LiM_2(PO_4)_3$ is, for example, $1 \times 10^{-5}$ S/cm to $1 \times 10^{-3}$ S/cm.

Detailed examples of the lithium phosphate solid electrolyte having the NASICON structure include LATP ($Li_{1+x+y}Al_x(Ti, Ge)_{2-x}Si_yP_{3-y}O_{12}$; $0<x \leq 2$, $0 \leq y<3$), $Li_{1+x}Al_xGe_{2-x}(PO_4)_3$; $0 \leq x \leq 2$, $Li_{1+x}Al_xZr_{2-x}(PO_4)_3$; $0 \leq x \leq 2$, and $Li_{1+2x}Zr_{1-x}Ca_x(PO_4)_3$; $0 \leq x<1$. $Li_{1+2x}Zr_{1-x}Ca_x(PO_4)_3$ has high waterproofness and low reducibility and cost, and therefore, is preferably used as the inorganic solid electrolyte particles.

Examples of the oxide-based solid electrolyte other than the lithium phosphate solid electrolyte include LIPON ($Li_{2.9}PO_{3.3}N_{0.46}$) in an amorphous state, $La_{5+x}A_xLa_{3-x}M_2O_{12}$ (A is Ca, Sr, or Ba, and M is Nb or Ta) having a garnet structure, $Li_3M_{2-x}L_2O_{12}$ (M is Ta, Nb, and L is Zr), $Li_{7-3x}Al_xLa_3Zr_3O_{12}$, and LLZ ($Li_7La_3Zr_2O_{12}$). The solid electrolyte may be of one type, or two or more types may be used in mixture. The ionic conductivity of LIPON is, for example, $1 \times 10^{-6}$ S/cm to $5 \times 10^{-6}$ S/cm. The ionic conductivity of LLZ is, for example, $1 \times 10^{-4}$ S/cm to $5 \times 10^{-4}$ S/cm.

As the solid electrolyte particles, a sodium containing solid electrolyte may be used. The sodium containing solid electrolyte is excellent in the ionic conductivity of sodium ions. As the sodium containing solid electrolyte, β-alumina, sodium phosphorus sulfide, sodium phosphorus oxide, or the like can be used. The sodium containing solid electrolyte preferably has a glass-ceramic form.

The shape of an inorganic solid particle is not particularly limited. It can have, for example, a spherical shape, an elliptical shape, a flat shape, or a fibrous shape.

The average particle size of the inorganic solid particles is preferably 15 μm or less, and more preferably 12 μm or less. If the average particle size of the inorganic solid particles is small, the resistance in the battery tends to be low.

The average particle size of the inorganic solid particles is preferably 0.01 μm or more, and more preferably 0.1 μm or more. If the average particle size of the inorganic solid particles is large, the agglomeration of particles tends to be suppressed.

Note that the average particle size of the inorganic solid particles means a particle size with which a volume integrated value becomes 50% in a particle size distribution obtained by a laser diffraction particle size distribution measuring apparatus. As a sample used when performing the particle size distribution measurement, a dispersion obtained by diluting the inorganic solid particles by ethanol such that the concentration becomes 0.01 mass % to 5 mass % is used.

The content of the inorganic solid particles in the separator is preferably 70 mass % or more, and more preferably 80 mass % or more. If the content of the inorganic solid particles is large, the internal short circuit is more difficult to occur.

The content of the inorganic solid particles in the separator is preferably 99.5 mass % or less, and more preferably 99.3 mass % or less. If the content of the inorganic solid particles is small, the mass of the separator can be lowered, the mass energy density of the battery can be increased, and the weight can be reduced.

The film thickness of the separator is preferably 60 μm or less, more preferably 40 μm or less, and much more preferably 30 μm or less. If the film thickness of the separator is small, the energy density of the battery can be increased.

The film thickness of the separator is preferably 5 μm or more, more preferably 6 μm or more, and much more preferably 8 μm or more. If the film thickness of the separator is large, the internal short circuit is more difficult to occur.

The film thickness of the separator can be obtained by, for example, the following method. First, for the SEM image of the section of the electrode structure in the thickness direction obtained by the above-described method, the thickness of a portion concerning the separator is measured. This measurement is performed for SEM images obtained at five arbitrary points of the electrode structure, and the average value of the thicknesses is obtained as the film thickness of the separator.

The separator may include a binder, an ion conductive polymer, and the like in addition to the layer of organic fibers and the inorganic solid particles.

The binder has a function of binding the inorganic solid particles to the layer of organic fibers. As the binder, the same material as that used in the electrode described above can be used. The content of the binder in the separator preferably falls within range of 1 mass % to 7 mass %.

The ion conductive polymer raises the ionic conductivity of the separator. The ion conductive polymer preferably covers at least some of the organic fibers and preferably covers at least some of the inorganic solid particles. If the ion conductive polymer covers the organic fibers, the layer of organic fibers hardly peels off from the active material containing layer. If the ion conductive polymer covers the organic fibers and the inorganic solid particles, the inorganic solid particles hardly peel off from the layer of organic fibers. The ion conductive polymer may be evenly contained in the separator, or may be unevenly distributed on the electrode side or surface side.

The ion conductive polymer may have a solid state or a gel state. The ion conductive polymer contains a polymer and a nonaqueous electrolyte. The ion conductive polymer may be a polymer in which a nonaqueous electrolyte is impregnated, or may be a complex of a nonaqueous electrolyte and a polymer. Details of the nonaqueous electrolyte will be described later.

Examples of the polymer include polyvinylidene fluoride (PVdF), polyacrylonitrile (PAN), polyethylene oxide (PEO), and a mixture thereof. As the polymer, a polymeric material that forms a gel with a carbonate such as polymethyl methacrylate can be used.

The separator can be manufactured by, for example, the following method.

First, an electrode is prepared. Next, a layer of organic fibers is formed on the electrode. More specifically, the above-described organic material is dissolved in an organic solvent to prepare a raw material solution. As the organic solvent, an arbitrary solvent such as dimethylacetamide (DMAc), dimethyl sulfoxide (DMSO), N,N-dimethylformamide (DMF), N-methylpyrrolidone (NMP), water, or alcohol can be used. The concentration of the organic fibers in the raw material solution falls within the range of, for example, 5 mass % to 60 mass %.

Next, the raw material solution is applied to the surface of the electrode by the electrospinning method, thereby directly forming the layer of organic fibers. More specifically, an electrospinning apparatus is prepared. The electrospinning apparatus includes a spinning nozzle, a high voltage generator configured to apply a voltage to the spinning nozzle, and a metering pump that supplies the raw material solution to the spinning nozzle. Next, the raw material solution is emitted from the spinning nozzle toward the surface of the electrode while applying a voltage to the spinning nozzle using the high voltage generator. Accordingly, a string-shaped organic fiber accumulates on the surface of the electrode, and the layer of organic fibers is formed.

In the electrospinning method, the applied voltage is appropriately determined in accordance with the solvent/solute species, the boiling point/vapor pressure curve of the solvent, the solution concentration, the temperature, the nozzle shape, the sample-nozzle distance, and the like. The electric potential difference between the nozzle and the work is set to, for example, 0.1 kV to 100 kV. The supply rate of the raw material solution is also appropriately determined in accordance with the solution concentration, the solution viscosity, the temperature, the pressure, the applied voltage, the nozzle shape, and the like. If the nozzle shape is a syringe type, the supply rate is set to, for example, 0.1 µl/min to 500 µl/min per nozzle. If the nozzle shape is a multiple nozzle or a slit, the supply rate can be determined in accordance with the opening area.

Note that the layer of organic fibers may be formed using an inkjet method, a jet dispenser method, a spray coating method, or the like.

Next, a layer of inorganic solid particles is formed on the layer of organic fibers. More specifically, inorganic solid particles, a binder, and a solvent are mixed, thereby obtaining a dispersion. The concentration of the inorganic solid particles in the dispersion is set to, for example, 10 mass % to 40 mass %. As the solvent, for example, dimethylacetamide (DMAc), dimethyl sulfoxide (DMSO), N,N-dimethylformamide (DMF), N-methylpyrrolidone (NMP), water, alcohol, or the like can be used. Next, the dispersion is applied onto the layer of organic fibers. Note that if the liquidity of the dispersion is sufficiently high, the dispersion can be applied using a spray or micro gravure method.

Then, the layer of organic fibers after the application of the inorganic solid particles is dried, thereby obtaining an electrode-integrated type separator. The thus obtained electrode-integrated type separator may be subjected to press processing. When press processing is performed, the adhesion between the active material-containing layer and the layer of organic fibers and the adhesion between the organic fibers and the inorganic solid particles can be increased.

The uneven distribution of the inorganic solid particles in the separator can be adjusted by the particle size of the inorganic solid particles, the weight of the layer of organic fibers per unit area, the thickness of the organic fiber, the load in press processing, or the like.

In addition, the film thickness of the separator can be adjusted by the thickness of the layer of organic fibers, the thickness of the layer of inorganic solid particles, the load in press processing, or the like. The thickness of the layer of organic fibers can be adjusted by, for example, the application amount of the raw material solution or the thickness of the organic fiber. The thickness of the layer of inorganic solid particles can be adjusted by, for example, the application amount of the dispersion or the particle size of the inorganic solid particles.

A method of manufacturing a separator containing an ion conductive polymer will be described next. First, an electrode-integrated type separator is prepared in accordance with the same procedure as described above.

Next, the monomer of the above-described polymer, an electrolyte salt, and an organic solvent are mixed to prepare a solution mixture. As the electrolyte salt and the organic solvent, an electrolyte salt and an organic solvent that are the same as those to be described later concerning a nonaqueous electrolyte can be used.

Next, the solution mixture is impregnated in the electrode-integrated type separator. Then, for example, the separator is heated, thereby hydrolyzing the electrolyte salt to generate an acid catalyst and polymerizing the monomer. As the acid catalyst, for example, an inorganic acid such as hydrogen fluoride (HF), a sulfonic acid, a carboxylic acid, and a mixture thereof can be used. In this way, a separator integrated with the ion conductive polymer, that is, a gel nonaqueous electrolyte can be obtained. Note that a polymerization initiator may be used, instead of using the acid catalyst.

According to the above-described first embodiment, an electrode structure is provided. The electrode structure includes an electrode and a separator. The electrode includes an active material-containing layer. The active material containing layer contains active material particles. The separator includes a layer of organic fibers and inorganic solid particles. The inorganic solid particles are supported on the layer of organic fibers. The inorganic solid particles are disposed so as to be biased to the surface side of the separator. Hence, when the electrode structure according to the first embodiment is used, it is possible to make a short circuit difficult to occur due to peeling of the active material-containing layer.

Second Embodiment

According to the second embodiment, a secondary battery including the electrode structure according to the first embodiment, a counter electrode, and an electrolyte is provided.

The electrode structure and the counter electrode can form an electrode group. The electrolyte can be held by the electrode group. Note that the secondary battery according to the second embodiment may further include a self-supporting film type separator arranged between the electrode structure and the counter electrode.

In addition, the secondary battery according to the second embodiment can further include a container member that stores the electrode group and the electrolyte.

Furthermore, the secondary battery according to the second embodiment can further include a negative electrode terminal electrically connected to a negative electrode and a positive electrode terminal electrically connected to a positive electrode.

The secondary battery according to the second embodiment can be, for example, a lithium secondary battery. In addition, the secondary battery includes a nonaqueous electrolyte secondary battery including a nonaqueous electrolyte.

The counter electrode, the electrolyte, the self-supporting film type separator, the container member, the negative electrode terminal, and the positive electrode terminal will be described below in detail.

(Counter Electrode)

The counter electrode faces the electrode structure according to the first embodiment. An explanation will be made below by defining the electrode according to the first embodiment as a first electrode and the counter electrode as a second electrode.

When the first electrode is a negative electrode, the second electrode can be a positive electrode. When the first electrode is a positive electrode, the second electrode can be a negative electrode.

As in the first embodiment, the second electrode may be an electrode structure including an electrode-integrated type separator. In this case, the first electrode and the second electrode may face each other across each other's separators. Alternatively, the electrodes and the separators may be arranged alternately.

(Electrolyte)

As the electrolyte, for example, a liquid nonaqueous electrolyte or a gel nonaqueous electrolyte can be used. The liquid nonaqueous electrolyte is prepared by dissolving an electrolyte salt serving as a solute in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoride arsenic lithium ($LiAsF_6$), lithium trifluoromethanesulfonate ($LiCF_3SO_3$), and lithium bis (trifluoromethanesulfonimide) ($LiN(CF_3SO_2)_2$), and a mixture thereof. The electrolyte salt is preferably hardly oxidized at a high potential, and $LiPF_6$ is most preferable.

Examples of the organic solvent include cyclic carbonates such as propylene carbonate (PC), ethylene carbonate (EC), and vinylene carbonate (VC), chain carbonates such as diethyl carbonate (DEC), dimethyl carbonate (DMC), and methyl ethyl carbonate (MEC), cyclic ethers such as tetrahydrofuran (THF), 2-methyl tetrahydrofuran (2MeTHF), and dioxolane (DOX), chain ethers such as dimethoxy ethane (DME) and diethoxy ethane (DEE), γ-butyrolactone (GBL), acetonitrile (AN), and sulfolane (SL). These organic solvents can be used alone or a solvent mixture.

The gel nonaqueous electrolyte is prepared by compounding a liquid nonaqueous electrolyte and a polymeric material. As the gel nonaqueous electrolyte, the same substance as the above-described ion conductive polymer can be used.

Alternatively, as the nonaqueous electrolyte, a room temperature molten salt (ionic melt) containing lithium ions, a solid polyelectrolyte, an inorganic solid electrolyte, and the like may be used, in addition to the liquid nonaqueous electrolyte and the gel nonaqueous electrolyte.

In addition, the electrolyte may be an aqueous electrolyte. The aqueous electrolyte contains an aqueous solvent and an electrolyte salt. The aqueous electrolyte may be a liquid. The liquid aqueous electrolyte is prepared by dissolving the electrolyte salt serving as a solute in an aqueous solvent. As the electrolyte salt, the same electrolyte as described above can be used.

As the aqueous solvent, a solution containing water can be used. Here, the solution containing water may be pure water or a solvent mixture of water and an organic solvent.

The room temperature molten salt (ionic melt) represents a compound that can exist as a liquid at room temperature (15° C. to 25°) in organic salts each made of a combination of organic cations and anions. The room temperature molten salt includes a room temperature molten salt that exists a liquid alone, a room temperature molten salt that changes to a liquid when it is mixed with an electrolyte salt, a room temperature molten salt that changes to a liquid when it is dissolved in an organic solvent, and a mixture thereof. In general, the melting point of a room temperature molten salt used in a secondary battery is 25° C. or less. In addition, the organic cations generally have a quaternary ammonium skeleton.

The solid polyelectrolyte is prepared by dissolving an electrolyte salt in a polymeric material and solidifying.

The inorganic solid electrolyte is a solid substance having lithium ion conductivity.

(Self-Supporting Film Type Separator)

The self-supporting film type separator is formed from, for example, a porous film containing polyethylene (PE), polypropylene (PP), cellulose, or polyvinylidene fluoride (PVdF), or a nonwoven fabric made of a synthetic resin. From the viewpoint of safety, a porous film made of polyethylene or polypropylene is preferably used. This is because these porous films can melt at a predetermined temperature and cut a current.

(Container Member)

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can appropriately be selected based on the size of the battery and use of the battery.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 4.5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 6:
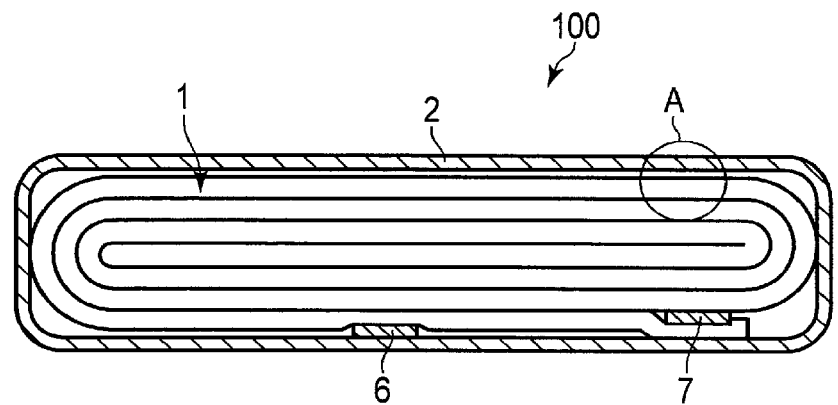
FIG. 6 is a cross-sectional view schematically showing an example of a secondary battery according to the second embodiment.
Figure 7:
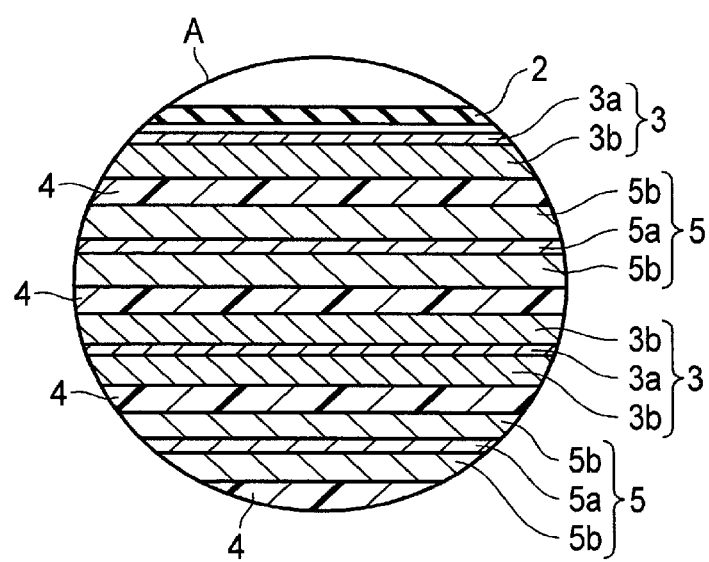
FIG. 7 is an enlarged cross-sectional view of section A of the secondary battery shown in FIG. 6.

FIG. 6 is a cross-sectional view schematically showing an example of a secondary battery according to the second embodiment. FIG. 7 is an enlarged cross-sectional view of section A of the secondary battery shown in FIG. 6.

The secondary battery 100 shown in FIGS. 6 and 7 includes a bag-shaped container member 2 shown in FIG. 6, an electrode group 1 shown in FIGS. 6 and 7, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 6, the electrode group 1 is a wound electrode group in a flat form. The wound electrode group 1 in a flat form includes a negative electrode 3, a separator 4, and a positive electrode 5, as shown in FIG. 7. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 7. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 6, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 8:
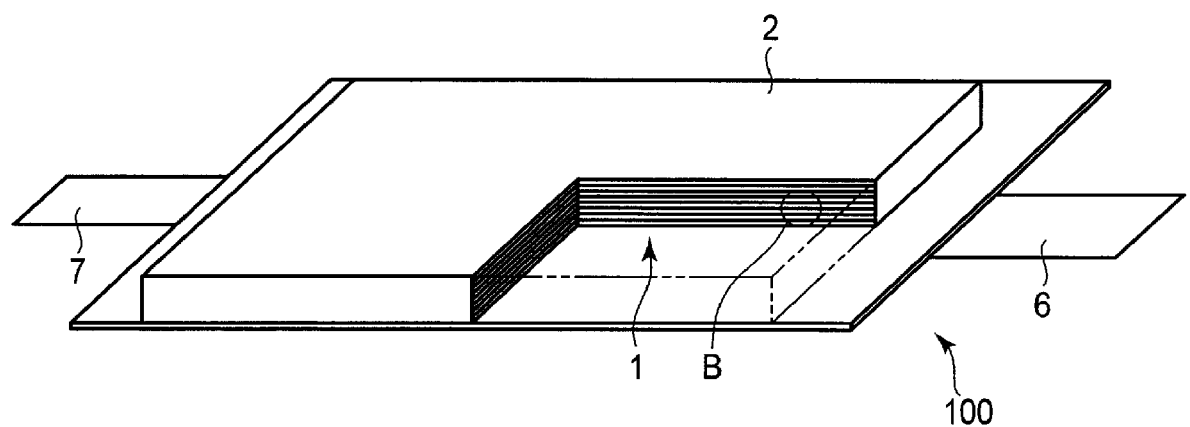
FIG. 8 is a partially cut-out perspective view schematically showing another example of a secondary battery according to the second embodiment.
Figure 9:
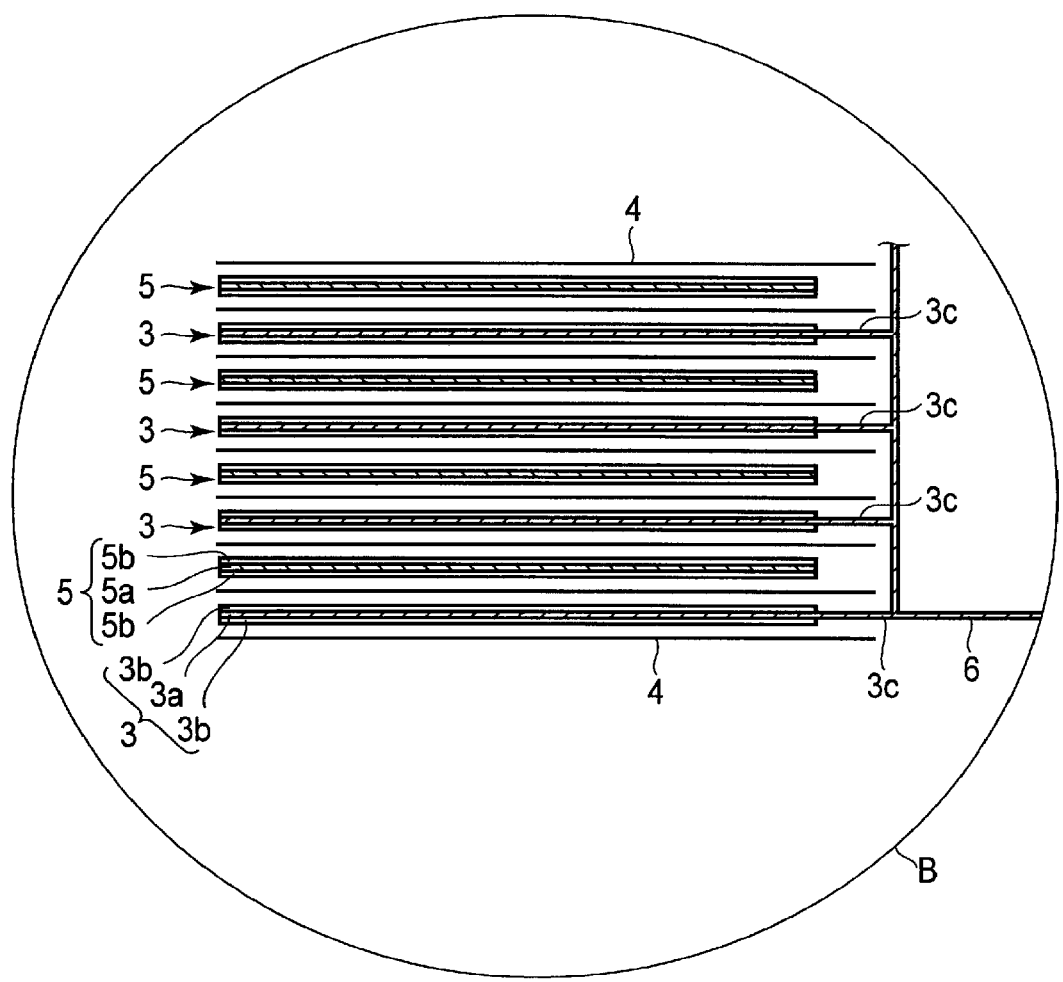
FIG. 9 is an enlarged cross-sectional view of section B of the secondary battery shown in FIG. 8.

The secondary battery according to the second embodiment is not limited to the secondary battery of the structure shown in FIGS. 6 and 7, and may be, for example, a battery of a structure as shown in FIGS. 8 and 9.

FIG. 8 is a partially cut-out perspective view schematically showing another example of a secondary battery according to the second embodiment. FIG. 9 is an enlarged cross-sectional view of section B of the secondary battery shown in FIG. 8.

The secondary battery 100 shown in FIGS. 8 and 9 includes an electrode group 1 shown in FIGS. 8 and 9, a container member 2 shown in FIG. 8, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 9, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 9, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the second embodiment includes the electrode structure according to the first embodiment. For this reason, the secondary battery according to the second embodiment hardly causes an internal short circuit. Hence, the secondary battery according to the second embodiment can implement a high capacity and weight reduction.

Third Embodiment

According to a third embodiment, a battery module is provided. The battery module according to the third embodiment includes plural secondary batteries according to the second embodiment.

In the battery module according to the third embodiment, each of the single batteries may be arranged electrically connected in series, in parallel, or in a combination of in-series connection and in-parallel connection.

An example of the battery module according to the third embodiment will be described next with reference to the drawings.

FIG. 10 is a perspective view schematically showing an example of the battery module according to the third embodiment. A battery module 200 shown in FIG. 10 includes five single-batteries 100a to 100e, four bus bars 21, a positive electrode-side lead 22, and a negative electrode-side lead 23. Each of the five single-batteries 100a to 100e is a secondary battery according to the second embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 10 is a battery module of five in-series connection.

As shown in FIG. 10, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the third embodiment includes the secondary battery according to the second embodiment. Hence, the battery module according to the third embodiment can implement a high capacity and weight reduction.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

FIG. 11 is an exploded perspective view schematically showing an example of the battery pack according to the fourth embodiment. FIG. 12 is a block diagram showing an example of an electric circuit of the battery pack shown in FIG. 11.

A battery pack 300 shown in FIGS. 11 and 12 includes a housing container 31, a lid 32, protective sheets 33, a battery module 200, a printed wiring board 34, wires 35, and an insulating plate (not shown).

The housing container 31 shown in FIG. 11 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

A single-battery 100 has a structure shown in FIGS. 6 and 7. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 12. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the fourth embodiment includes the secondary battery according to the second embodiment or the battery module according to the third embodiment. Hence, the battery pack according to fourth embodiment can implement a high capacity and weight reduction.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle according to the fifth embodiment can include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

An example of the vehicle according to the fifth embodiment is explained below, with reference to the drawings.

FIG. 13 is a cross-sectional view schematically showing an example of a vehicle according to the fifth embodiment.

A vehicle 400, shown in FIG. 13 includes a vehicle body 40 and a battery pack 300 according to the fifth embodiment. In FIG. 13, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 13, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Next, with reference to FIG. 14, an aspect of operation of the vehicle according to the fifth embodiment is explained.

FIG. 14 is a view schematically showing another example of the vehicle according to the fifth embodiment. A vehicle 400, shown in FIG. 14, is an electric automobile.

The vehicle 400, shown in FIG. 14, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 14, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 14) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment includes the battery pack according to the fourth embodiment. Hence, the vehicle according to fifth embodiment can implement high reliability and high performance.

EXAMPLES

Examples of the present invention will be described below. The present invention is not limited to the examples to be described below.

Example 1

(Production of Positive Electrode)

A positive electrode was produced in the following way.

First, a positive electrode active material, a conductive agent, and a binder were dispersed in a solvent to prepare a slurry. The ratios of the positive electrode active material, the conductive agent, and the binder were 93 mass %, 5 mass %, and 2 mass %, respectively. As the positive electrode active material, a lithium nickel cobalt manganese composite oxide ($LiNi_{0.5}Co_{0.2}Mn_{0.3}O_2$) was used. As the conductive agent, a mixture of acetylene black and carbon black was used. The mass ratio of acetylene black and carbon black in the mixture was 2:1. As the binder, polyvinylidene fluoride (PVdF) was used. As the solvent, N-methylpyrrolidone (NMP) was used.

Next, the prepared slurry was applied to both surfaces of a positive electrode current collector, and the coatings were dried, thereby forming a positive electrode active material-containing layer. As the positive electrode current collector, an aluminum alloy foil having a thickness of 12 μm was used. Next, the positive electrode current collector and the positive electrode active material-containing layer were pressed, thereby producing a positive electrode.

(Production of Negative Electrode)

A negative electrode was produced in the following way.

First, a negative electrode active material, a conductive agent, and a binder were dispersed in a solvent to prepare a slurry. The ratios of the negative electrode active material, the conductive agent, and the binder were 95 mass %, 3 mass %, and 2 mass %, respectively. As the negative electrode active material, lithium titanium oxide LTO ($Li_4Ti_5O_{12}$) powder was used. The lithium ion insertion/extraction potential of the lithium titanium oxide was 1.5 V (vs. Li/Li$^+$) to 1.7 V (vs. Li/Li$^+$). As the conductive agent, a mixture of acetylene black and carbon black was used. The mass ratio of acetylene black and carbon black in the mixture was 2:1. As the binder, PVdF was used. As the solvent, NMP was used.

Next, the obtained slurry was applied to both surfaces of a negative electrode current collector, and the coatings were dried, thereby forming a negative electrode active material containing layer. As the negative electrode current collector, an aluminum alloy foil having a thickness of 12 μm was used. Next, the negative electrode current collector and the negative electrode active material-containing layer were pressed, thereby obtaining a negative electrode.

(Production of Separator)

First, a layer of organic fibers was formed on the entire negative electrode active material-containing layer using an electrospinning method. More specifically, an organic material was dissolved in an organic solvent to prepare a raw material solution. The concentration of the organic material in the raw material solution was 15 mass %. As the organic material, polyvinylidene was used. As the organic solvent, dimethylacetamide was used. Next, a voltage of 15.5 V was applied to the spinning nozzle of the electrospinning apparatus using a high voltage generator. Then, the raw material solution was supplied to the spinning nozzle at a supply rate of 5 μl/min using a metering pump, and the raw material solution was emitted from the spinning nozzle toward a negative electrode surface. The spinning nozzle was moved on the negative electrode surface, thereby forming a layer of organic fibers on the negative electrode surface. Then, a layer of organic fibers was formed on the negative electrode active material-containing layer on the other surface as well by the same method. Note that the thickness of the organic fiber was 380 nm, and the weight of the organic fibers per unit area was $1.1 \times 10^{-4}$ g/cm$^2$.

Next, the layer of organic fibers was caused to support inorganic solid particles. More specifically, the inorganic solid particles and a binder were dispersed in a solvent to prepare a dispersion. The ratios of the inorganic solid particles and the binder were 30 mass % and 1.5 mass %, respectively. As the inorganic solid particles, alumina ($Al_2O_3$) with an average particle size of 1.8 μm was used. The lithium ion conductivity of the alumina at 25° C. was 0 S/cm. As the binder, carboxymethyl cellulose was used. Then, the dispersion was applied onto the layer of organic fibers using a spray. Application of the dispersion was similarly done on the layer of organic fibers on the other surface as well. Next, the layers of organic fibers with the dispersion applied were dried, thereby obtaining an electrode-integrated type separator. A negative electrode structure in which separators were formed on both surfaces of the negative electrode active material containing layer was thus obtained.

(Production of Nonaqueous Electrolyte)

An electrolyte salt was dissolved in an organic solvent, thereby obtaining a liquid nonaqueous electrolyte. As the electrolyte salt, $LiPF_6$ was used. The mol concentration of $LiPF_6$ in the nonaqueous electrolyte was 15 mol/L. As the organic solvent, a solvent mixture of propylene carbonate (PC) and diethyl carbonate (DEC) was used. The volume ratio of PC and DEC was 1:2.

(Production of Secondary Battery)

A laminated body was obtained by laminating a positive electrode and a negative electrode structure such that the separator was located between the positive electrode and the negative electrode. Next, the laminated body was spirally wound to prepare an electrode group. The electrode group was hot-pressed to prepare a flat electrode group. The obtained electrode group was stored in a thin metal can.

Next, the liquid nonaqueous electrolyte was poured in the above-described metal can container storing the electrode group, thereby preparing a secondary battery.

Example 2

A secondary battery was obtained in accordance with the same procedure as described in Example 1 except that LiLaZrO ($Li_7La_3Zr_2O_{12}$) was used as inorganic solid particles instead of using alumina. The average particle size of LiLaZrO was 1.8 μm, and the lithium ion conductivity at 25° C. was $3 \times 10^{-4}$ S/cm.

Example 3

A secondary battery was obtained in accordance with the same procedure as described in Example 1 except that LiAlTiPO ($Li_2O\_Al_2O_3$—$SiO_2$—$P_2O_5$—$TiO_2$) was used as inorganic solid particles instead of using alumina, and the application amount of the dispersion containing inorganic solid particles was increased. The average particle size of LiAlTiPO was 1.0 μm, and the lithium ion conductivity at 25° C. was $1 \times 10^{-4}$ S/cm.

Example 4

A secondary battery was obtained in accordance with the same procedure as described in Example 3 except that the thickness of the organic fiber was changed from 380 nm to 300 nm.

Example 5

A secondary battery was obtained in accordance with the same procedure as described in Example 3 except that the thickness of the organic fiber was changed from 380 nm to 300 nm, and the weight of the organic fibers per unit area was changed from $1.1 \times 10^{-4}$ g/cm$^2$ to $2.5 \times 10^{-4}$ g/cm$^2$.

Example 6

A secondary battery was obtained in accordance with the same procedure as described in Example 3 except that the thickness of the organic fiber was changed from 380 nm to 300 nm, and the weight of the organic fibers per unit area was changed from $1.1 \times 10^{-4}$ g/cm$^2$ to $3.0 \times 10^{-4}$ g/cm$^2$.

Example 7

A secondary battery was obtained in accordance with the same procedure as described in Example 2 except that the organic solvent of the nonaqueous electrolyte was changed from the solvent mixture of PC and DEC to a solvent mixture of PC and ethyl methyl carbonate (EMC). Note that the volume ratio of PC and EMC was 1:2.

Example 8

A secondary battery was obtained in accordance with the same procedure as described in Example 3 except that the organic solvent of the nonaqueous electrolyte was changed from the solvent mixture of PC and DEC to the solvent mixture of PC and EMC.

Example 9

First, a negative electrode structure and a liquid nonaqueous electrolyte were prepared in accordance with the same procedure as described in Example 1. Next, a monomer was added to the liquid nonaqueous electrolyte, thereby obtaining a solution mixture. The concentration of the monomer in the solution mixture was 2 mass %. As the monomer, methyl methacrylate was used. Next, an electrode group and the solution mixture were stored in a container can and heated at a temperature of 60° C. for 24 hrs, thereby changing the liquid nonaqueous electrolyte to a gel. A secondary battery containing an ion conductive polymer was thus obtained.

Example 10

A negative electrode structure was obtained in accordance with the same procedure as described in Example 1 except that zirconia ($ZrO_2$) was used instead of using alumina. The average particle size of zirconia was 1.8 μm, and the lithium ion conductivity at 25° C. was 0 S/cm. Next, a secondary battery was obtained in accordance with the same procedure as described in Example 9 except that the negative electrode structure was used.

Example 11

A negative electrode structure was prepared in accordance with the same procedure as described in Example 3. Next, a secondary battery was obtained in accordance with the same procedure as described in Example 9 except that the negative electrode structure was used.

Example 12

A secondary battery was obtained in accordance with the same procedure as described in Example 11 except that the average particle size of LiAlTiPO was changed from 1.0 μm to 0.4 μm, the thickness of the organic fiber was changed from 380 nm to 170 nm, and the weight of the organic fibers per unit area was changed from $1.1 \times 10^{-4}$ g/cm$^2$ to $3.0 \times 10^{-4}$ g/cm$^2$.

Example 13

A negative electrode structure was obtained in accordance with the same procedure as described in Example 1 except that LiZrCaPO ($Li_{1.2}Zr_{1.9}Ca_{0.1}P_3O_{12}$) was used instead of using alumina, the thickness of the organic fiber was changed from 380 nm to 300 nm, and the application amount of the dispersion containing inorganic solid particles was increased. The average particle size of LiZrCaPO was 2.8 μm, and the lithium ion conductivity at 25° C. was $1.2 \times 10^{-4}$ S/cm. Next, a secondary battery was obtained in accordance with the same procedure as described in Example 9 except that the negative electrode structure was used.

Example 14

A layer of organic fibers was obtained in accordance with the same procedure as described in Example 1 except that the thickness of the organic fiber was changed from 380 nm to 300 nm. Next, a dispersion containing inorganic solid particles was prepared in accordance with the same procedure as described in Example 1 except that LiZrCaPO was used instead place of alumina ($Al_2O_3$). Then, the dispersion was applied onto the layer of organic fibers using a spray. Application of the dispersion was similarly done on the layer of organic fibers on the other surface as well. Note that the application amount of the dispersion was larger than the application amount of the dispersion of Example 1. Next, after the layers of organic fibers with the dispersion applied were dried, press processing was performed for the entire separator. A negative electrode structure with separators formed on both surfaces of a negative electrode active material-containing layer was thus obtained. Next, a secondary battery was obtained in accordance with the same procedure as described in Example 9 except that the negative electrode structure was used.

Example 15

A layer of organic fibers was obtained in accordance with the same procedure as described in Example 1 except that the thickness of the organic fiber was changed from 380 nm to 300 nm. Next, a dispersion containing inorganic solid particles was prepared in accordance with the same procedure as described in Example 1 except that LiZrCaPO was used instead place of alumina ($Al_2O_3$). Then, the dispersion was applied onto the layer of organic fibers using a spray. Application of the dispersion was similarly done on the layer of organic fibers on the other surface as well. Next, after the layers of organic fibers with the dispersion applied were dried, press processing was performed for the entire separator. Next, the dispersion was applied to a surface of the separator after the drying using a spray. Application of the dispersion was similarly done on the surface of the separator on the other surface as well. Note that the application amount of the dispersion was larger than the application amount of the dispersion of Example 1. A negative electrode structure with separators formed on both surfaces of a negative electrode active material-containing layer was thus obtained. Next, a secondary battery was obtained in accordance with the same procedure as described in Example 9 except that the negative electrode structure was used.

Example 16

A secondary battery was obtained in accordance with the same procedure as described in Example 2 except that polyvinylidene fluoride (PVdF) was used as an organic material in place of polyamide-imide, the thickness of the organic fiber was changed from 380 nm to 300 nm, and the weight of the organic fibers per unit area was changed from $1.1 \times 10^{-4}$ $g/cm^2$ to $3.0 \times 10^{-4}$ $g/cm^2$.

Example 17

A secondary battery was obtained in accordance with the same procedure as described in Example 3 except that the average particle size of LiAlTiPO was changed from 1.0 μm to 0.4 μm, polyvinylidene fluoride (PVdF) was used as an organic material in place of polyamide-imide, the thickness of the organic fiber was changed from 380 nm to 170 nm, and the weight of the organic fibers per unit area was changed from $1.1 \times 10^{-4}$ $g/cm^2$ to $3.0 \times 10^{-4}$ $g/cm^2$.

Example 18

A secondary battery was obtained in accordance with the same procedure as described in Example 12 except that a sodium niobium titanium composite oxide ($Li_2Na_{1.5}Ti_{5.5}Nb_{0.5}O_{14}$) was used as a negative electrode active material in place of lithium titanium oxide. The lithium ion insertion/extraction potential of the sodium niobium titanium composite oxide was 1.0 V (vs. $Li/Li^+$) to 1.3 V (vs. $Li/Li^+$).

Example 19

A secondary battery was obtained in accordance with the same procedure as described in Example 13 except that a sodium niobium titanium composite oxide was used as a negative electrode active material in place of lithium titanium oxide, the average particle size of LiZrCaPO was changed from 2.8 μm to 1.0 μm, and the weight of the organic fibers per unit area was changed from $1.1 \times 10^{-4}$ $g/cm^2$ to $3.0 \times 10^{-4}$ $g/cm^2$.

Example 20

A secondary battery was obtained in accordance with the same procedure as described in Example 12 except that a niobium titanium composite oxide ($Nb_2TiO_7$) was used as a negative electrode active material in place of lithium titanium oxide. The lithium ion insertion/extraction potential of the niobium titanium composite oxide was 1.3 V (vs. $Li/Li^+$) to 1.5 V (vs. $Li/Li^+$).

Example 21

A secondary battery was obtained in accordance with the same procedure as described in Example 19 except that the niobium titanium composite oxide was used as a negative electrode active material in place of the sodium niobium titanium composite oxide, and the thickness of the organic fiber was changed from 300 nm to 170 nm.

Example 22

A secondary battery was obtained in accordance with the same procedure as described in Example 19 except that the niobium titanium composite oxide was used as a negative electrode active material in place of the sodium niobium titanium composite oxide, a layer of inorganic solid particles was formed on the layer of organic fibers using a micro gravure method in place of a spray, and after the formation of the layer of inorganic solid particles, press processing was performed for the separator.

Comparative Example 1

First, a negative electrode was produced in accordance with the same procedure as described in Example 1 except that the niobium titanium composite oxide was used as a negative electrode active material in place of the lithium titanium composite oxide. Next, inorganic solid particles and a binder were dispersed in a solvent to prepare a slurry. The ratios of the inorganic solid particles and the binder were 30 mass % and 1.5 mass %, respectively. As the inorganic solid particles, LiAlTiPO was used. As the binder, carboxymethyl cellulose was used. Then, the slurry was applied onto a negative electrode active material-containing layer and dried, thereby obtaining an electrode-integrated type separator formed from the film of the inorganic solid particles. The film thickness of the film of the inorganic solid particles was 14 μm. A negative electrode structure was thus obtained.

Next, a secondary battery was obtained in accordance with the same procedure as described in Example 9 except that the negative electrode structure was used.

Comparative Example 2

A secondary battery was obtained in accordance with the same procedure as described in Comparative Example 1 except that LiAlGePO ($Li_{1.5}Al_{0.5}Ge_{1.5}P_3O_{12}$) was used as inorganic solid particles in place of LiAlTiPO, and the thickness of the film of the inorganic solid particles was changed from 14 μm to 56 μm. The average particle size of LiAlGePO was 1.7 μm, and the lithium ion conductivity at 25° C. was $4×10^{-4}$ S/cm.

Comparative Example 3

A secondary battery was obtained in accordance with the same procedure as described in Example 9 except that application of the dispersion containing the inorganic solid particles onto the layer of organic fibers was omitted.

Comparative Example 4

A secondary battery was obtained in accordance with the same procedure as described in Example 9 except that the formation of the layer of organic fibers and the spray application of the dispersion containing the inorganic solid particles were simultaneously executed.

Comparative Example 5

A secondary battery was obtained in accordance with the same procedure as described in Example 13 except that a polyethylene film was used in place of the layer of organic fibers.

Comparative Example 6

A secondary battery was obtained in accordance with the same procedure as described in Comparative Example 5 except that a nonwoven fabric made of cellulose was used in place of the polyethylene film.

<Evaluation Method>
(Existence Ratio of Inorganic Solid Particles in Section of Separator)

For each of the separators according to Examples 1 to 22 and Comparative Examples 1, 2, and 4 to 6, ratios A, B, and C of the inorganic solid particles in regions R1 to R3 of the section of the separator in the thickness direction were measured by the above-described method. The result is shown in Table 1.

(Film Thickness of Separator)

For each of the separators according to Examples 1 to 22 and Comparative Examples 1 to 6, the film thickness was measured by the above-described method. The result is shown in Table 1.

(Self-Discharge Rate)

For each of the secondary batteries according to Examples 1 to 22 and Comparative Examples 1 to 6, the self-discharge rate was measured. First, each secondary battery was charged at a temperature of 25° C. until the SOC (State Of Charge) became 100% and, after that, discharged until the SOC became 0%. Next, the battery after the discharge was charged until the SOC became 50%, and the battery voltage immediately after the charge was measured using a tester. The battery voltage at this time was defined as an initial voltage V. Next, the battery was left stand at the room temperature for seven days, and after that, the battery voltage was measured using a tester. The battery voltage at this time was defined as a post-test voltage ΔV. Next, the post-test voltage ΔV was divided by the initial voltage V, thereby calculating a self-discharge rate ΔV/V. Note that the secondary battery according to Comparative Example 1 could not be charged because an internal short circuit occurs. The result is shown in Table 2.

(Rate Characteristic)

For each of the secondary batteries according to Examples 1 to 22 and Comparative Examples 1 to 6, the rate characteristic was measured. More specifically, first, each secondary battery was charged by constant current charge at a rate of 1 C until the SOC became 100%. After that, constant current charge was performed until the rate became 1/20 C. Next, the secondary battery was discharged at a rate of 5 C until the SOC became 0%. The discharge capacity at this time was defined as a 5 C discharge capacity. Next, the secondary battery was charged again at a rate of 1 C unit the SOC became 100%. After that, constant current charge was performed until the rate became 1/20 C. Next, the secondary battery was discharged at a rate of 1 C until the SOC became 0%. The discharge capacity at this time was defined as a 1 C discharge capacity. Next, the 5 C discharge capacity was divided by the 1 C discharge capacity, thereby calculating a capacity ratio 5 C discharge capacity/1 C discharge capacity. The result is shown in Table 2.

Table 1 summarizes data concerning the separators according to Examples 1 to 22 and Comparative Examples 1 to 6.

TABLE 1

| | Constituent component | | | | | | Separator | | | |
|---|---|---|---|---|---|---|---|---|---|---|
| | Inorganic solid particles | | | Organic fibers | | | Existence ratio of inorganic solid particles | | | |
| | Type | Average particle size (μm) | Organic material | Thickness (nm) | Weight of fibers per unit area (g/cm²) | Ion conductive polymer | Ratio A (%) | Ratio C (%) | Ratio B (%) | Thickness (μm) |
| Example 1 | $Al_2O_3$ | 1.8 | Polyamide imide | 380 | $1.1 × 10^{-4}$ | Absent | 0 | 18 | 63 | 14 |
| Example 2 | $Li_2La_3Zr_2O_{12}$ | 1.8 | Polyamide imide | 380 | $1.1 × 10^{-4}$ | Absent | 0 | 20 | 60 | 14 |
| Example 3 | $Li_2O$—$Al_2O_3$—$SiO_2$—$P_2O_5$—$TiO_2$ | 1.0 | Polyamide imide | 380 | $1.1 × 10^{-4}$ | Absent | 2 | 24 | 73 | 17 |
| Example 4 | $Li_2O$—$Al_2O_3$—$SiO_2$—$P_2O_5$—$TiO_2$ | 1.0 | Polyamide imide | 300 | $1.1 × 10^{-4}$ | Absent | 5 | 27 | 69 | 17 |
| Example 5 | $Li_2O$—$Al_2O_3$—$SiO_2$—$P_2O_5$—$TiO_2$ | 1.0 | Polyamide imide | 300 | $2.5 × 10^{-4}$ | Absent | 5 | 31 | 71 | 17 |
| Example 6 | $Li_2O$—$Al_2O_3$—$SiO_2$—$P_2O_5$—$TiO_2$ | 1.0 | Polyamide imide | 300 | $3.0 × 10^{-4}$ | Absent | 1 | 21 | 75 | 17 |
| Example 7 | $Li_2La_3Zr_2O_{12}$ | 1.8 | Polyamide imide | 380 | $1.1 × 10^{-4}$ | Absent | 0 | 20 | 60 | 14 |
| Example 8 | $Li_2O$—$Al_2O_3$—$SiO_2$—$P_2O_5$—$TiO_2$ | 1.0 | Polyamide imide | 380 | $1.1 × 10^{-4}$ | Absent | 2 | 24 | 73 | 17 |
| Example 9 | $Al_2O_3$ | 1.8 | Polyamide imide | 380 | $1.1 × 10^{-4}$ | Present | 0 | 18 | 63 | 14 |
| Example 10 | $ZrO_2$ | 1.6 | Polyamide imide | 380 | $1.1 × 10^{-4}$ | Present | 0 | 20 | 61 | 14 |
| Example 11 | $Li_2O$—$Al_2O_3$—$SiO_2$—$P_2O_5$—$TiO_2$ | 1.0 | Polyamide imide | 380 | $1.1 × 10^{-4}$ | Present | 2 | 24 | 73 | 17 |

TABLE 1-continued

| | Constituent component | | | | | | Separator | | | |
| | Inorganic solid particles | | Organic fibers | | | | Existence ratio of inorganic solid particles | | | |
| | Type | Average particle size (μm) | Organic material | Thickness (nm) | Weight of fibers per unit area (g/cm²) | Ion conductive polymer | Ratio A (%) | Ratio C (%) | Ratio B (%) | Thickness (μm) |
|---|---|---|---|---|---|---|---|---|---|---|
| Example 12 | $Li_2O$—$Al_2O_3$—$SiO_2$—$P_2O_5$—$TiO_2$ | 0.4 | Polyamide imide | 170 | $3.0 \times 10^{-4}$ | Present | 8 | 37 | 74 | 13 |
| Example 13 | $Li_{1.2}Zr_{1.9}Ca_{0.1}P_3O_{12}$ | 2.8 | Polyamide imide | 300 | $1.1 \times 10^{-4}$ | Present | 0 | 23 | 64 | 20 |
| Example 14 | $Li_{1.2}Zr_{1.9}Ca_{0.1}P_3O_{12}$ | 2.8 | Polyamide imide | 300 | $1.1 \times 10^{-4}$ | Present | 1 | 11 | 80 | 20 |
| Example 15 | $Li_{1.2}Zr_{1.9}Ca_{0.1}P_3O_{12}$ | 2.8 | Polyamide imide | 300 | $1.1 \times 10^{-4}$ | Present | 0 | 30 | 58 | 20 |
| Example 16 | $Li_2La_3Zr_2O_{12}$ | 1.8 | PVdF | 300 | $3.0 \times 10^{-4}$ | Absent | 0 | 20 | 62 | 14 |
| Example 17 | $Li_2O$—$Al_2O_3$—$SiO_2$—$P_2O_5$—$TiO_2$ | 0.4 | PVdF | 170 | $3.0 \times 10^{-4}$ | Absent | 7 | 35 | 75 | 13 |
| Example 18 | $Li_2O$—$Al_2O_3$—$SiO_2$—$P_2O_5$—$TiO_2$ | 0.4 | Polyamide imide | 170 | $3.0 \times 10^{-4}$ | Present | 8 | 37 | 74 | 13 |
| Example 19 | $Li_{1.2}Zr_{1.9}Ca_{0.1}P_3O_{12}$ | 1.0 | Polyamide imide | 300 | $3.0 \times 10^{-4}$ | Present | 0 | 25 | 66 | 13 |
| Example 20 | $Li_2O$—$Al_2O_3$—$SiO_2$—$P_2O_5$—$TiO_2$ | 0.4 | Polyamide imide | 170 | $3.0 \times 10^{-4}$ | Present | 6 | 38 | 75 | 10 |
| Example 21 | $Li_{1.2}Zr_{1.9}Ca_{0.1}P_3O_{12}$ | 1.0 | Polyamide imide | 170 | $3.0 \times 10^{-4}$ | Present | 2 | 35 | 75 | 10 |
| Example 22 | $Li_{1.2}Zr_{1.9}Ca_{0.1}P_3O_{12}$ | 1.0 | Polyamide imide | 300 | $3.0 \times 10^{-4}$ | Present | 0 | 35 | 95 | 9 |
| Comparative example 1 | $Li_2O$—$Al_2O_3$—$SiO_2$—$P_2O_5$—$TiO_2$ | 1.0 | | | | Present | 62 | 65 | 58 | 14 |
| Comparative example 2 | $Li_{1.5}Al_{0.5}Ga_{1.5}P_3O_{12}$ | 1.7 | | — | | Present | 51 | 56 | 62 | 56 |
| Comparative example 3 | — | | Polyamide imide | 380 | $1.1 \times 10^{-4}$ | Present | — | — | — | 14 |
| Comparative example 4 | $Al_2O_3$ | 1.8 | Polyamide imide | 380 | $1.1 \times 10^{-4}$ | Present | 62 | 62 | 62 | 14 |
| Comparative example 5 | $Li_{1.2}Zr_{1.9}Ca_{0.1}P_3O_{12}$ | 2.8 | Polyethylene film | | | Present | 0 | 8 | 75 | 20 |
| Comparative example 6 | $Li_{1.2}Zr_{1.9}Ca_{0.1}P_3O_{12}$ | 2.8 | Nonwoven fabric made of cellulose | | | Present | 0 | 8 | 75 | 20 |

Referring to Table 1, of columns under the heading "inorganic solid particles" in the columns under the heading "constituent component", a column with a notation "type" describes the type of each compound used as the inorganic solid particles. In addition, a column with a notation "average particle size (μm)" describes the average particle size of the inorganic solid particles.

Furthermore, of columns under the heading "organic fibers", a column with a notation "organic material" describes the type of each compound used as the organic fibers. In addition, a column with a notation "thickness (nm)" describes the average diameter of a section in a direction perpendicular to the longitudinal direction of the organic fibers. Moreover, a column with a notation "weight of organic fibers per unit area (g/cm²)" describes the mass of the organic fibers per unit area of the active material containing layer.

In addition, a column with a notation "ion conductive polymer" describes whether each separator is impregnated with an ion conductive polymer, that is, a gel nonaqueous electrolyte.

Furthermore, of columns under the heading "existence ratio of inorganic solid particles" in the columns under the heading "separator", a column with a notation "ratio A (%)" describes the ratio of the area of the inorganic solid particles to the total area of the electrode-side region. A column with a notation "ratio C (%)" describes the ratio of the area of the inorganic solid particles to the total area of the intermediate region. A column with a notation "ratio B (%)" describes the ratio of the area of the inorganic solid particles to the total area of the surface-side region.

In addition, a column with a notation "thickness (μm)" describes the film thickness of each separator.

Table 2 summarizes data concerning the secondary batteries according to Examples 1 to 22 and Comparative Examples 1 to 6.

TABLE 2

| | Positive electrode | Negative electrode | Electrolyte | | Battery characteristic | |
| | | | | | Self discharge | Rate |
| | Positive electrode active material | Negative electrode active material | Electrolyte salt | Solvent | rate (%) | characteristic (%) |
|---|---|---|---|---|---|---|
| Example 1 | $LiNi_{0.5}Co_{0.2}Mn_{0.3}O_2$ | $Li_4Ti_5O_{12}$ | $LiPF_6$ | PC, DEC | 1.7 | 82 |
| Example 2 | $LiNi_{0.5}Co_{0.2}Mn_{0.3}O_2$ | $Li_4Ti_5O_{12}$ | $LiPF_6$ | PC, DEC | 2 | 84 |
| Example 3 | $LiNi_{0.5}Co_{0.2}Mn_{0.3}O_2$ | $Li_4Ti_5O_{12}$ | $LiPF_6$ | PC, DEC | 1.3 | 84 |
| Example 4 | $LiNi_{0.5}Co_{0.2}Mn_{0.3}O_2$ | $Li_4Ti_5O_{12}$ | $LiPF_6$ | PC, DEC | 1.4 | 85 |
| Example 5 | $LiNi_{0.5}Co_{0.2}Mn_{0.3}O_2$ | $Li_4Ti_5O_{12}$ | $LiPF_6$ | PC, DEC | 1.3 | 85 |
| Example 6 | $LiNi_{0.5}Co_{0.2}Mn_{0.3}O_2$ | $Li_4Ti_5O_{12}$ | $LiPF_6$ | PC, DEC | 1 | 85 |
| Example 7 | $LiNi_{0.5}Co_{0.2}Mn_{0.3}O_2$ | $Li_4Ti_5O_{12}$ | $LiPF_6$ | PC, EMC | 2 | 86 |
| Example 8 | $LiNi_{0.5}Co_{0.2}Mn_{0.3}O_2$ | $Li_4Ti_5O_{12}$ | $LiPF_6$ | PC, EMC | 1.3 | 86 |

TABLE 2-continued

|  | Positive electrode | Negative electrode | Electrolyte | | Battery characteristic | |
|---|---|---|---|---|---|---|
|  | | | | | Self discharge | Rate |
|  | Positive electrode active material | Negative electrode active rraterial | Electrolyte salt | Solvent | rate (%) | characteristic (%) |
| Example 9 | $LiNi_{0.5}Co_{0.2}Mn_{0.3}O_2$ | $Li_4Ti_5O_{12}$ | $LiPF_6$ | PC, DEC | 1.2 | 86 |
| Example 10 | $LiNi_{0.5}Co_{0.2}Mn_{0.3}O_2$ | $Li_4Ti_5O_{12}$ | $LiPF_6$ | PC, DEC | 1.3 | 86 |
| Example 11 | $LiNi_{0.5}Co_{0.2}Mn_{0.3}O_2$ | $Li_4Ti_5O_{12}$ | $LiPF_6$ | PC, DEC | 0.9 | 88 |
| Example 12 | $LiNi_{0.5}Co_{0.2}Mn_{0.3}O_2$ | $Li_4Ti_5O_{12}$ | $LiPF_6$ | PC, DEC | 0.8 | 88 |
| Example 13 | $LiNi_{0.5}Co_{0.2}Mn_{0.3}O_2$ | $Li_4Ti_5O_{12}$ | $LiPF_6$ | PC, DEC | 1.3 | 86 |
| Example 14 | $LiNi_{0.5}Co_{0.2}Mn_{0.3}O_2$ | $Li_4Ti_5O_{12}$ | $LiPF_6$ | PC, DEC | 0.9 | 86 |
| Example 15 | $LiNi_{0.5}Co_{0.2}Mn_{0.3}O_2$ | $Li_4Ti_5O_{12}$ | $LiPF_6$ | PC, DEC | 1.5 | 86 |
| Example 16 | $LiNi_{0.5}Co_{0.2}Mn_{0.3}O_2$ | $Li_4Ti_5O_{12}$ | $LiPF_6$ | PC, DEC | 2 | 84 |
| Example 17 | $LiNi_{0.5}Co_{0.2}Mn_{0.3}O_2$ | $Li_4Ti_5O_{12}$ | $LiPF_6$ | PC, DEC | 0.8 | 88 |
| Example 18 | $LiNi_{0.5}Co_{0.2}Mn_{0.3}O_2$ | $Li_2Na_{1.5}Ti_{5.5}Nb_{0.5}O_{14}$ | $LiPF_6$ | PC, DEC | 0.8 | 88 |
| Example 19 | $LiNi_{0.5}Co_{0.2}Mn_{0.3}O_2$ | $Li_2Na_{1.5}Ti_{5.5}Nb_{0.5}O_{14}$ | $LiPF_6$ | PC, DEC | 0.8 | 88 |
| Example 20 | $LiNi_{0.5}Co_{0.2}Mn_{0.3}O_2$ | $Nb_2TiO_7$ | $LiPF_6$ | PC, DEC | 0.7 | 90 |
| Example 21 | $LiNi_{0.5}Co_{0.2}Mn_{0.3}O_2$ | $Nb_2TiO_7$ | $LiPF_6$ | PC, DEC | 0.7 | 90 |
| Example 22 | $LiNi_{0.5}Co_{0.2}Mn_{0.3}O_2$ | $Nb_2TiO_7$ | $LiPF_6$ | PC, DEC | 0.8 | 87 |
| Comparative example 1 | $LiNi_{0.5}Co_{0.2}Mn_{0.3}O_2$ | $Nb_2TiO_7$ | $LiPF_6$ | PC, DEC | — | — |
| Comparative example 2 | $LiNi_{0.5}Co_{0.2}Mn_{0.3}O_2$ | $Nb_2TiO_7$ | $LiPF_6$ | PC, DEC | 22 | 15 |
| Comparative example 3 | $LiNi_{0.5}Co_{0.2}Mn_{0.3}O_2$ | $Li_4Ti_5O_{12}$ | $LiPF_6$ | PC, DEC | 26 | 74 |
| Comparative example 4 | $LiNi_{0.5}Co_{0.2}Mn_{0.3}O_2$ | $Li_4Ti_5O_{12}$ | $LiPF_6$ | PC, DEC | 19 | 70 |
| Comparative example 5 | $LiNi_{0.5}Co_{0.2}Mn_{0.3}O_2$ | $Li_4Ti_5O_{12}$ | $LiPF_6$ | PC, DEC | 1 | 68 |
| Comparative example 6 | $LiNi_{0.5}Co_{0.2}Mn_{0.3}O_2$ | $Li_4Ti_5O_{12}$ | $LiPF_6$ | PC, DEC | 1 | 66 |

Referring to Table 2, a column with a notation "positive electrode active material" under the heading "positive electrode" describes the type of each positive electrode active material. In addition, a column with a notation "negative electrode active material" under the heading "negative electrode" describes the type of each negative electrode active material.

In addition, of columns under the heading "electrolyte", a column with a notation "electrolyte salt" describes the type of each electrolyte salt. Furthermore, a column with a notation "solvent" describes the type of each solvent.

Additionally, of columns under the heading "battery characteristic", a column with a notation "self-discharge rate (%)" describes the self-discharge rate ΔV/V obtained by dividing the post-test voltage ΔV by the initial voltage V. A column with a notation "rate characteristic (%)" describes the capacity ratio 5 C discharge capacity/1 C discharge capacity obtained by dividing the 5 C discharge capacity by the 1 C discharge capacity.

As shown in Tables 1 and 2, the self-discharge rates and the rate characteristics of the secondary batteries according to Examples 1 to 22 each of which used the separator including the layer of organic fibers and the inorganic solid particles and in which the inorganic solid particles were unevenly distributed on the surface side were more excellent than the self-discharge rates and the rate characteristics according to Comparative Examples 1 and 2 each of which did not include the layer of organic fibers, Comparative Example 3 which did not include the inorganic solid particles, Comparative Example 4 in which the inorganic solid particles evenly existed, and Comparative Examples 5 and 6 each of which used the self-supporting film type separator in place of the layer of organic fibers.

Additionally, as is apparent from the comparison of Examples 1 to 3, when inorganic solid particles having a lithium ion conductivity of $1 \times 10^{-5}$ g/cm$^2$ or more at 25° C. were used, there was observed a tendency that the self-discharge rate lowered, and the rate characteristic rose, as compared to a case in which the inorganic solid particles were used.

Furthermore, as is apparent from Examples 1 and 9, and Examples 3 and 11, when the ion conductive polymer was used, there was observed a tendency that the self-discharge rate lowered, and the rate characteristic rose, as compared to a case in which the liquid nonaqueous electrolyte was used.

As shown in Tables 1 and 2, even if the type of the negative electrode active material and the type of the nonaqueous electrolyte were changed, an excellent self-discharge rate could be implemented.

According to at least one embodiment described above, an electrode structure is provided. The electrode structure includes an electrode and a separator. The electrode includes an active material containing layer. The active material containing layer contains active material particles. The separator includes a layer of organic fibers, and inorganic solid particles. The inorganic solid particles are supported on the layer of organic fibers. The inorganic solid particles are disposed so as to be biased to the surface side of the separator. Hence, when the electrode structure according to the embodiment is used, a short circuit caused by peeling of the active material containing layer can be made difficult to occur.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A secondary battery, comprising:
a negative electrode comprising a current collector and a negative electrode active material-containing layer containing negative electrode active material particles;
a separator consisting of a layer of organic fibers directly integrated on the negative electrode active material-containing layer, and inorganic solid particles on the layer of organic fibers, wherein the layer of organic fibers includes a portion of the negative electrode active material-containing layer;
a positive electrode comprising a current collector and a positive electrode active material-containing layer formed on the current collector, the positive electrode active material-containing layer facing the inorganic solid particles of the separator; and
an electrolyte,
wherein a section of the separator in a direction orthogonal to a main surface of the negative electrode comprises a surface side region in the surface side, an intermediate region, and negative electrode-side region,
wherein a measurement region of the negative electrode structure is defined to have: a rectangular shape; a height in the direction orthogonal to the main surface of the negative electrode; a width in a direction parallel to the main surface of the negative electrode; a negative electrode side facing the negative electrode; and a surface side located opposite to the negative electrode side,
wherein the width of the measurement region is three or more times larger than the height of the measurement region,
wherein a ratio of the height of the measurement region to a height of a portion having the longest distance from the main surface of the negative electrode in the section of the separator is 0.95 or more,
wherein an area of each of the surface-side region, the negative electrode-side region, and the intermediate region are areas obtainable by dividing the measurement region by straight lines parallel to the main surface of the electrode,
wherein the position of the negative electrode side of the measurement region is defined to be a 0%-level, and the position of the surface side of the measurement region is defined to be a 100%-level,
wherein the height of the area of the negative electrode-side region extends from the 0%-level to a 5%-level of the measurement region, the height of the area of the intermediate region extends from the 5%-level to a 90%-level of the measurement region, and the height of the area of the surface-side region extends from the 90%-level to the 100%-level,
wherein inorganic solid particles exist in the surface-side region and the intermediate region, and
wherein a ratio B of the inorganic solid particles in the area of the surface-side region is higher than a ratio A of the inorganic solid particles in the area of the electrode-side region.

2. The secondary battery according to claim 1, wherein a ratio C of the inorganic solid particles in the area of the intermediate region is higher than the ratio A and lower than the ratio B.

3. The secondary battery according to claim 1, wherein the ratio B is 50% to 100%.

4. The secondary battery according to claim 1, wherein the ratio A is 0% to 10%.

5. The secondary battery according to claim 2, wherein the ratio C is 10% to 40%.

6. The secondary battery according to claim 1, wherein the inorganic solid particles comprise solid electrolyte particles having a lithium ion conductivity of not less than $1 \times 10^{-5}$ S/cm at 25° C.

7. A secondary battery, comprising:
a negative electrode comprising a current collector and a negative electrode active material-containing layer containing negative electrode active material particles; and
a separator consisting of a layer of organic fibers directly integrated on the negative electrode active material-containing layer, and inorganic solid particles on the layer of organic fibers, the layer of organic fibers further containing an ion conductive polymer, wherein the layer of organic fibers includes a portion of the negative electrode active material-containing layer;
a positive electrode comprising a current collector and a positive electrode active material-containing layer formed on the current collector the positive electrode active material-containing layer facing the inorganic solid particles of the separator; and
an electrolyte,
wherein a section of the separator in a direction orthogonal to a main surface of the negative electrode comprises a surface side region in the surface side, an intermediate region, and negative electrode-side region,
wherein a measurement region of the negative electrode structure is defined to have: a rectangular shape; a height in the direction orthogonal to the main surface of the negative electrode; a width in a direction parallel to the main surface of the negative electrode; a negative electrode side facing the negative electrode; and a surface side located opposite to the negative electrode side,
wherein the width of the measurement region is three or more times larger than the height of the measurement region,
wherein a ratio of the height of the measurement region to a height of a portion having the longest distance from the main surface of the electrode in the section of the separator is 0.95 or more,
wherein an area of each of the surface-side region, the negative electrode-side region, and the intermediate region are areas obtainable by dividing the measurement region by straight lines parallel to the main surface of the negative electrode,
wherein the position of the negative electrode side of the measurement region is defined to be a 0%-level, and the position of the surface side of the measurement region is defined to be a 100%-level,
wherein the height of the area of the negative electrode-side region extends from the 0%-level to a 5%-level of the measurement region, the height of the area of the intermediate region extends from the 5%-level to a 90%-level of the measurement region, and the height of the area of the surface-side region extends from the 90%-level to the 100%-level, wherein inorganic solid particles exist in the surface-side region and the intermediate region, and wherein a ratio B of the inorganic solid particles in the area of the surface-side region is higher than a ratio A of the inorganic solid particles in the area of the electrode-aide region.

8. The secondary battery according to claim 1, wherein the active material particles comprise a compound whose lithium ion insertion/extraction potential is 1.0 (vs. Li/Li$^+$) to 3.0 V (vs. Li/Li$^+$) with respect to a potential based on metallic lithium.

9. The secondary battery according to claim 1, wherein the active material particles comprise at least one compound selected from the group consisting of a lithium titanate having a ramsdellite structure, a lithium titanate having a spinet structure, a monoclinic titanium dioxide, an anatase type titanium dioxide, a rutile type titanium dioxide, a hollandite type titanium composite oxide, an orthorhombic titanium containing composite oxide, and a monoclinic niobium titanium composite oxide.

10. A battery pack comprising the secondary battery according to claim 1.

11. The battery pack according to claim 10, further comprising:

an external power distribution terminal; and a protective circuit.

12. The battery pack according to claim 10, wherein:

the battery pack includes a plurality of secondary batteries, and the secondary batteries are electrically connected in series, in parallel, or in combination of series and parallel.

13. A vehicle comprising the battery pack according to claim 10.

14. The vehicle according to claim 13, which comprises a mechanism configured to convert kinetic energy of the vehicle into regenerative energy.

15. The secondary battery according to claim 1, wherein the organic fibers contain at least one organic material selected from the group consisting of polyamide imide, polyamide, polyolefin, polyether, polyimide, polyketone, polysulfone, cellulose, polyvinyl alcohol, and polyvinylidene fluoride.

* * * * *